(12) United States Patent
Kakino et al.

(10) Patent No.: US 8,511,811 B2
(45) Date of Patent: Aug. 20, 2013

(54) INK COMPOSITION, INK SET AND IMAGE FORMING METHOD

(75) Inventors: Ryuki Kakino, Kanagawa (JP); Yasufumi Ooishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 279 days.

(21) Appl. No.: 12/859,301

(22) Filed: Aug. 19, 2010

(65) Prior Publication Data

US 2011/0057985 A1 Mar. 10, 2011

(30) Foreign Application Priority Data

Sep. 9, 2009 (JP) .................................. 2009-208472

(51) Int. Cl.
*B41J 2/01* (2006.01)
(52) U.S. Cl.
USPC ........................................... 347/100; 347/95
(58) Field of Classification Search
USPC ................. 347/100, 95, 96, 101, 102, 21, 20, 347/9; 103/31.6, 31.13, 31.27; 523/160, 523/161
See application file for complete search history.

(56) References Cited

U.S. PATENT DOCUMENTS

| | | | | |
|---|---|---|---|---|
| 5,916,963 | A * | 6/1999 | Hashimoto et al. | 524/588 |
| 6,376,597 | B1 * | 4/2002 | Coca et al. | 524/504 |
| 2005/0124726 | A1 | 6/2005 | Yatake et al. | |
| 2006/0014855 | A1 | 1/2006 | House et al. | |
| 2007/0216743 | A1 * | 9/2007 | Makuta et al. | 347/100 |
| 2008/0188610 | A1 * | 8/2008 | Polk et al. | 524/539 |
| 2009/0088521 | A1 * | 4/2009 | Hosokawa et al. | 524/558 |
| 2009/0202724 | A1 * | 8/2009 | Arai et al. | 106/31.86 |
| 2009/0203833 | A1 * | 8/2009 | Sasada et al. | 524/558 |

FOREIGN PATENT DOCUMENTS

| | | | |
|---|---|---|---|
| EP | 1717282 | A | 11/2006 |
| EP | 1834997 | A | 9/2007 |
| EP | 2045300 | A | 4/2009 |
| EP | 2058375 | A | 5/2009 |
| EP | 2075269 | A | 7/2009 |
| EP | 2090625 | A | 8/2009 |
| EP | 2166046 | A | 3/2010 |
| JP | 2004-097955 | A | 4/2004 |
| JP | 2007-246675 | A | 9/2007 |
| JP | 2009-91528 | A | 4/2009 |
| WO | 2008/081996 | A | 7/2008 |

OTHER PUBLICATIONS

Partial English language translation of following: Office action dated Jun. 18, 2013 from the Japanese Patent Office in a Japanese patent application corresponding to the instant patent application.

* cited by examiner

*Primary Examiner* — Manish S Shah
(74) *Attorney, Agent, or Firm* — SOLARIS Intellectual Property Group, PLLC

(57) ABSTRACT

An ink composition including colored particles is disclosed. The colored particles includes a resin dispersant including at least one radically polymerizable group and at least one aromatic partial structure derived from a compound selected from the group consisting of an aromatic hydrocarbon compound, a condensed ring aromatic hydrocarbon compound, an aromatic heterocyclic compound, a condensed ring aromatic heterocyclic compound, and a compound having two or more aromatic hydrocarbon compounds linked to each other; and a colorant.

17 Claims, No Drawings

INK COMPOSITION, INK SET AND IMAGE FORMING METHOD

CROSS-REFERENCE TO RELATED APPLICATION

This Application claims priority under 35 USC 119 from Japanese Patent Application No. 2009-208472 filed on Sep. 9, 2009, the disclosure of which is incorporated by reference herein.

BACKGROUND OF THE INVENTION

1. Technical Field

The present invention relates to an ink composition, an ink set, and an image forming method.

2. Description of the Related Art

In recent years, as a result of ever-increasing demand for the protection of resources, the protection of the environment, the enhancement of operational stability, and the like, the conversion of paints and inks into aqueous products is advancing. As in the case of oil-based paints and oil-based inks, the qualities required in aqueous paints and aqueous inks include fluidity, storage stability, glossiness of film, clarity, coloring ability, and the like. However, compared to oil-based vehicles, most pigments have a markedly poor adaptability to aqueous vehicles with respect to pigment dispersibility and the like and, therefore, satisfactory quality cannot be obtained by conventional dispersion methods. The use of various additives, for example, aqueous pigment dispersion resins or surfactants, has hitherto been studied, but an aqueous paint or an aqueous ink that satisfies all the adaptation properties described above and is comparable to existing high quality oil-based paints or high quality oil-based inks has not been obtained.

In order to solve these problems, for example, an aqueous pigment ink containing a pigment dispersion containing pigment particles that are encapsulated by a polymer containing 20% by mass to 70% by mass of aromatic rings has been disclosed (see, for example, U.S. Patent Application Publication No. 2005/0124726). Further, a pigment ink for ink-jet recording containing a pigment dispersion which is prepared by using, as a dispersant, a random copolymer of a hydrophilic monomer and a hydrophobic monomer, in which the content of the hydrophobic monomer is 50% by weight to 80% by weight with respect to the polymer weight, has been disclosed (see, for example, U.S. Patent Application Publication No. 2006/0014855).

In addition, a technique for obtaining ink-jet output materials having excellent cured film strength by using a pigment dispersion which is prepared by using a polymerizable group-introduced dispersant and a UV curing type material in combination has been disclosed (see, for example, Japanese Patent Application Laid-Open (JP-A) No. 2004-97955).

SUMMARY OF THE INVENTION

According to a first aspect of the present invention, an ink composition including colored particles is disclosed. The colored particles includes a resin dispersant including at least one radically polymerizable group and at least one aromatic partial structure derived from a compound selected from the group consisting of an aromatic hydrocarbon compound, a condensed ring aromatic hydrocarbon compound, an aromatic heterocyclic compound, a condensed ring aromatic heterocyclic compound and a compound having two or more aromatic hydrocarbon compounds linked to each other; and a colorant.

According to another aspect of the present invention, an ink set comprising the ink composition of the first aspect, and a treatment liquid including an aggregating agent that forms an aggregate at the ink-jet ink composition when the treatment liquid is in contact with the ink composition, is provided.

According to another aspect of the present invention, an image forming method including forming an image by supplying the ink composition of the first aspect onto a recording medium, is provided.

DETAILED DESCRIPTION OF THE INVENTION

In the aqueous pigment ink described in U.S. Patent Publication No. 2005/0124726, the content of the aromatic rings contained in the polymer for encapsulating and dispersing the pigment is too high, and as a result, the aqueous pigment ink cannot provide sufficiently satisfactory properties of an aqueous ink, specifically, dispersibility. Further, in the pigment ink described in U.S. Patent Application Publication No. 2006/0014855, hydrophilicity of the dispersant polymer is too high, and as a result, the pigment ink is too viscous and is insufficient in stability over time with respect to viscosity and particle diameters of dispersed particles. Furthermore, when an aqueous ink prepared in accordance with the techniques disclosed in U.S. Patent Application Publication Nos. 2005/0124726 and 2006/0014855 is used as an ink-jet recording ink, the obtained printed matter can hardly be said to have sufficient image strength.

When the polymer dispersant described in JP-A No. 2004-97955 is used, pigment dispersibility is insufficient and satisfactory glossiness cannot be obtained.

In addition, when an aqueous ink prepared in accordance with the techniques disclosed in any one of U.S. Patent Application Publication Nos. 2005/0124726 and 2006/0014855, and JP-A No. 2004-97955 is used as an ink-jet recording ink, the aqueous ink does not exhibit sufficiently satisfactory ejection stability.

<Ink Composition>

The ink composition of the present invention includes at least one type of colorant particles including: a resin dispersant including at least one radically polymerizable group and at least one aromatic partial structure derived from a compound selected from the group consisting of an aromatic hydrocarbon compound, a condensed ring aromatic hydrocarbon compound, an aromatic heterocyclic compound, a condensed ring aromatic heterocyclic compound, and a compound containing two or more aromatic hydrocarbon compounds linked to each other; and a colorant. The ink composition of the present invention may further include other components, if necessary.

When an ink composition having such configuration is used, an image having high glossiness can be formed, and when the ink composition having such configuration is applied to an ink-jet method, excellent ejection stability and excellent and ejection recoverability may be provided.

[Colored Particles]

The colored particles according to the present invention include at least one resin dispersant and at least one colorant, which are described below. Further, it is preferable that, in the colored particles, at least a part of the surface of the colorant is covered with the resin dispersant.

(Resin Dispersant)

The resin dispersant according to the present invention is used as a dispersant for dispersing the colorant.

The structure of the resin dispersant includes, in a polymer that forms the resin dispersant, (1) at least one aromatic partial structure derived from a compound selected from the group consisting of an aromatic hydrocarbon compound, a condensed ring aromatic hydrocarbon compound, an aromatic heterocyclic compound, a condensed ring aromatic heterocyclic compound, and a compound containing two or more aromatic hydrocarbon compounds linked to each other, and (2) at least one radically polymerizable group. When a resin dispersant has this structure, the interaction between the resin dispersant and the colorant may become stronger, and the colorant may be more finely dispersed, and a dispersion of colored particles which is excellent in stability over time may be obtained. Further, together with a polymerizable compound which may be included in the ink composition, the resin dispersant can form an image having high glossiness and high strength.

(1) Aromatic Partial Structure

The above resin dispersant contains at least one aromatic partial structure. The aromatic partial structure is not particularly limited as far as it is a partial structure derived from a compound selected from the group consisting of an aromatic hydrocarbon compound, a condensed ring aromatic hydrocarbon compound, an aromatic heterocyclic compound, a condensed ring aromatic heterocyclic compound, and a compound containing two or more aromatic hydrocarbon compounds linked to each other. Above all, from the viewpoints of fine dispersibility and dispersion stability of the colorant, the aromatic partial structure is preferably a monovalent group derived from benzene, a condensed ring aromatic compound having 8 or more carbon atoms, a heterocyclic compound condensed with (an) aromatic ring(s), or a compound containing two or more benzene rings linked to each other.

From the viewpoints of the fine dispersibility and the dispersion stability of the colorant, it is preferable that the aromatic partial structure bonds to an atom, that is included in the main chain of the resin dispersant, through a divalent linking group, and is included in the hydrophobic structural unit of the resin dispersant, and it is more preferable that the aromatic partial structure is contained in the resin dispersant, as Ar in the hydrophobic structural unit represented by the following Formula (1).

Formula (1)

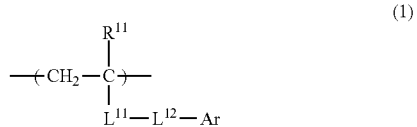

In Formula (1), $R^{11}$ represents a hydrogen atom or a methyl group.

In Formula (1), $L^{11}$ represents —COO—, —OCO—, —CONR$^{13}$— (wherein R$^{13}$ represents a hydrogen atom or an alkyl group having from 1 to 6 carbon atoms), —O—, or a substituted or unsubstituted phenylene group. It is preferable that $L^{11}$ represents —COO—, —CONH—, —CONCH$_3$—, or a substituted or unsubstituted phenylene group, and it is more preferable that $L^{11}$ represents —COO—.

In Formula (1), $L^{12}$ represents a single bond, a divalent linking group selected from the following group of linking groups, or a divalent linking group obtained by combining two or more divalent linking groups selected from the following group of linking groups.

When $L^{12}$ represents a divalent linking group obtained by combining two or more divalent linking groups selected from the following group of linking groups, the two or more divalent linking groups may be the same or different from each other.

(Group of Linking Groups)

Alkylene groups each having from 1 to 12 carbon atoms; alkenylene groups each having from 2 to 12 carbon atoms; —CO—; —NR$^{14}$— (wherein R$^{14}$ represents a hydrogen atom or an alkyl group having from 1 to 6 carbon atoms); —O—; —S—; —SO—; and —SO$_2$—

The above alkylene group preferably has from 1 to 12 carbon atoms, and more preferably from 2 to 6 carbon atoms.

The above alkenylene group preferably has from 2 to 12 carbon atoms, and more preferably from 2 to 4 carbon atoms.

The above alkylene group and alkenylene group, each independently, may be substituted by a substituent (for example, an alkyl group having from 1 to 6 carbon atoms, a halogen atom, a cyano group, an alkoxy group having from 1 to 6 carbon atoms, or the like), if possible.

$L^{12}$ preferably represents a single bond, or a divalent linking group including at least one selected from the group consisting of alkylene groups, —O—, —CO—, and —NR$^{14}$— (wherein R$^{14}$ represents a hydrogen atom or an alkyl group having from 1 to 6 carbon atoms), and more preferably represents a divalent linking group including at least one selected from the group consisting of alkylene groups, —O—, and —CO—.

In Formula (1), Ar represents a monovalent group derived from benzene, a condensed ring aromatic compound having 8 or more carbon atoms, a heterocyclic compound condensed with (an) aromatic ring(s), or a compound containing two or more benzene rings linked to each other. Herein, the term "a monovalent group derived from a compound" means a monovalent group which is produced by removing one hydrogen atom from an arbitrary position in the compound.

Examples of the condensed ring aromatic compound having 8 or more carbon atoms include an aromatic compound containing a condensed ring formed of two or more benzene rings condensed with each other, and an aromatic compound containing at least one aromatic ring and an alicyclic hydrocarbon condensed with the aromatic ring. Specific examples thereof include naphthalene, anthracene, fluorene, phenanthrene, and acenaphthene.

The heterocyclic compound condensed with (an) aromatic ring(s) is a compound of a condensed ring which is formed of an aromatic compound that does not contain a heteroatom (preferably, benzene) and a cyclic compound that has a heteroatom, being at least condensed together. Herein, it is preferred that the cyclic compound that has a heteroatom is a five-membered ring or a six-membered ring. The heteroatom is preferably a nitrogen atom, an oxygen atom, or a sulfur atom. The cyclic compound that has a heteroatom may have plural heteroatoms, and in this case, the heteroatoms may be the same or different from each other. Specific examples of the heterocyclic compound condensed with (an) aromatic ring(s) include phthalimide, naphthalimide, acridone, carbazole, benzoxazole, and benzothaizole.

The compound containing two or more benzene rings linked to each other means a compound containing two or more benzene rings which are bonded through a single bond, a divalent linking group, or a trivalent linking group. It is preferable that the divalent linking group is a divalent linking group selected from the group consisting of alkylene groups each having from 1 to 4 carbon atoms, —CO—, —O—, —S—, —SO—, —SO$_2$—, and combinations of two or more thereof. A methine group may be described as an example of the trivalent linking group.

Herein, the benzene rings may bond to each other through plural linking groups, and the plural linking groups may be the same or different. The number of the benzene rings is preferably from 2 to 6, and more preferably 2 or 3. Specific examples of the compound containing two or more benzene rings linked to each other include biphenyl, triphenylmethane, diphenylmethane, diphenyl ether, and diphenyl sulfone.

In Formula (1), Ar preferably represents a monovalent group derived from benzene, naphthalene, biphenyl, triphenylmethane, phthalimide, naphthalimide, acridone, fluorene, anthracene, phenanthrene, diphenylmethane, or carbazole, and more preferably represents a monovalent group derived from benzene, naphthalene, biphenyl, phthalimide, naphthalimide, or acridone.

Ar may have a substituent. Examples of the substituent may include an alkyl group, an alkoxy group, an alkylcarbonyl group, an alkylcarbonyloxy group, an alkyloxycarbonyloxy group, a halogen group, and a cyano group. Preferable examples of the substituent include an alkyl group having from 1 to 10 carbon atoms, an alkoxy group having from 1 to 10 carbon atoms, an alkylcarbonyl group having from 1 to 10 carbon atoms, an alkylcarbonyloxy group having from 1 to 10 carbon atoms, a chloro group, and a cyano group.

These substituents may be substituted by other substituent, and preferable examples of the substituent in this case are the same as described above. Further, when two or more substituents exist, these substituents may be the same or different from each other. Furthermore, if possible, these substituents may bond to each other to form a ring.

The copolymer including a repeating unit represented by the above Formula (1) may be formed through introducing a corresponding functional group by a polymer reaction after obtaining a copolymer, but is preferably formed by copolymerization in which a corresponding monomer represented by the following Formula (2) is used.

Formula (2)

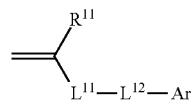

In Formula (2), $R^{11}$, $L^{11}$, $L^{12}$, and Ar each have the same definitions as the corresponding $R^{11}$, $L^{11}$, $L^{12}$, and Ar in Formula (1), respectively, and so are the preferable examples. One kind of monomer represented by Formula (2) may be used alone or two or more kinds thereof may be used in combination.

Specific examples of the monomer represented by Formula (2) include the monomers shown below. However, the present invention is not limited to these specific examples.

M-1

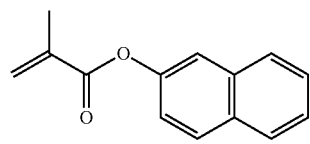

M-2

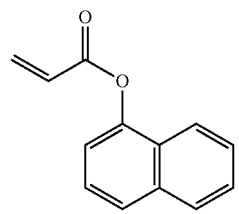

M-3

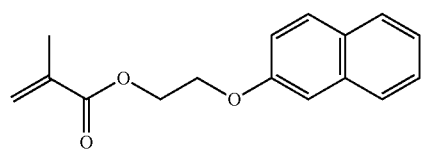

M-4

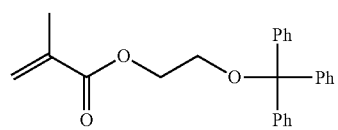

M-5

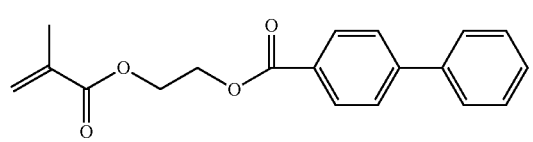

M-6

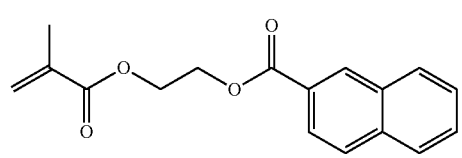

M-7

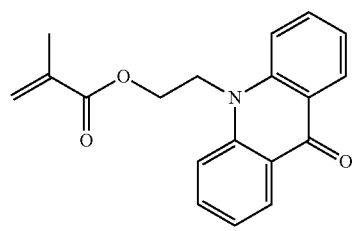

M-8

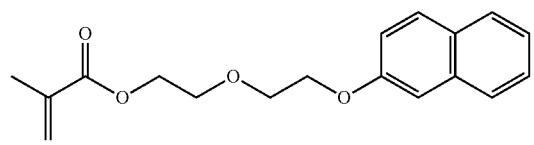

-continued
M-9
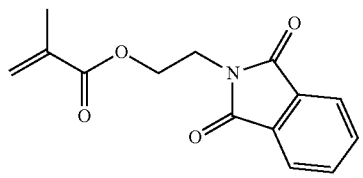
M-10
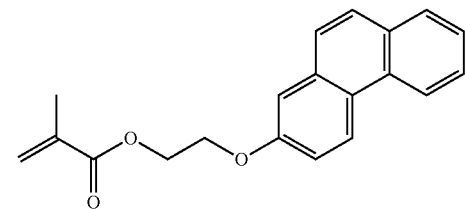
M-11
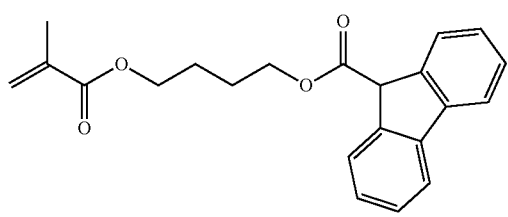
M-12
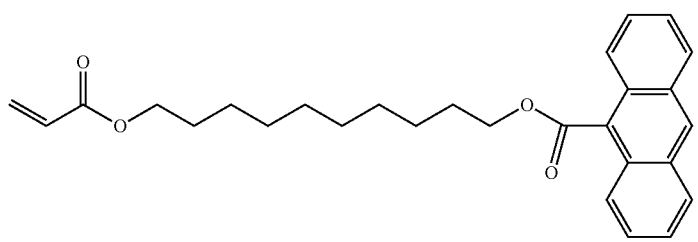
M-13
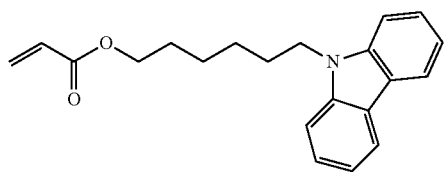
M-14
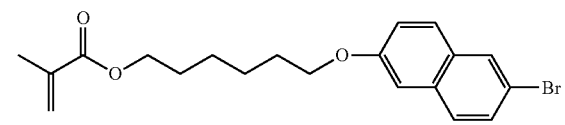
M-15
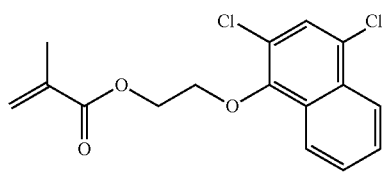
M-16
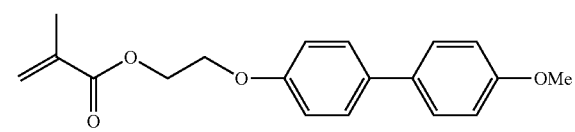
M-17
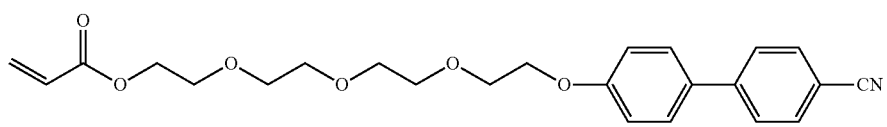
M-18
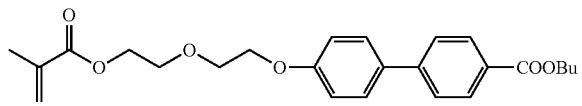
M-19
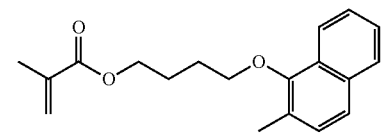
M-20
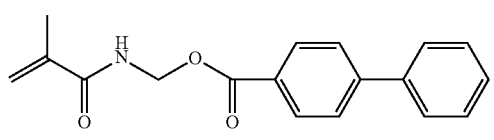
M-21
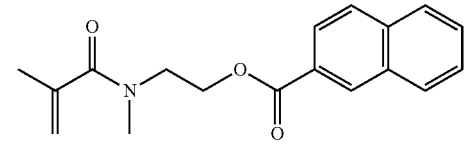

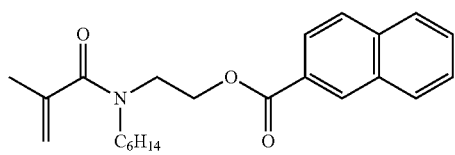
M-22

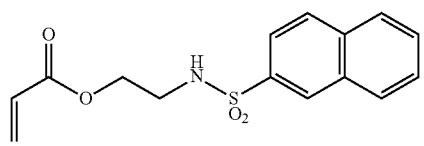
M-23

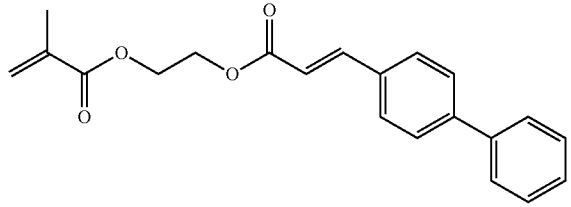
M-24

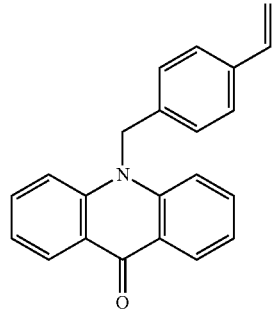
M-25

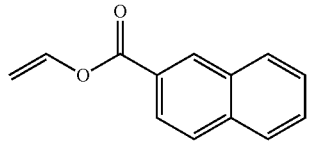
M-26

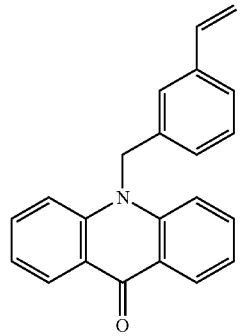
M-27

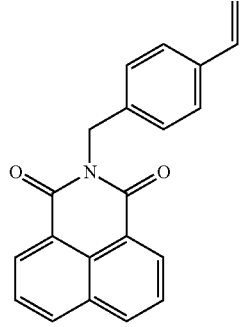
M-28

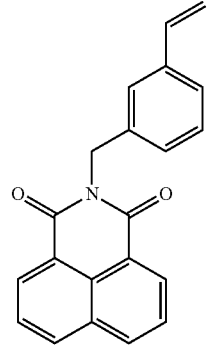
M-29

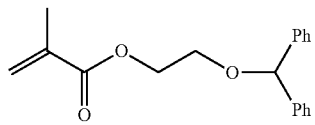
M-30

In the present invention, the content of the structural unit represented by Formula (1), which may be formed using the monomer represented by Formula (2), is preferably from 2% by mass to 95% by mass, more preferably from 5% by mass to 50% by mass, and particularly preferably from 5% by mass to 40% by mass, with respect to the total mass of the resin dispersant.

In the present invention, it is preferable that, in the structural unit represented by Formula (1), $L^{11}$ represents —COO—, —CONR$^{13}$—, or a substituted or unsubstituted phenylene group; $L^{12}$ represents a single bond, or a divalent linking group including at least one selected from the group consisting of alkylene groups, —O—, —CO—, and —NR$^{14}$— (wherein R$^{14}$ represents a hydrogen atom or an alkyl group having from 1 to 6 carbon atoms); and Ar represents a monovalent group derived from benzene, naphthalene, biphenyl, triphenylmethane, phthalimide, naphthalimide, acridone, fluorene, anthracene, phenanthrene, diphenylmethane, or carbazole.

It is more preferable that $L^{11}$ represents —COO—; $L^{12}$ represents a divalent linking group including at least one selected from the group consisting of alkylene groups, —O—, and —CO—; and Ar represents a monovalent group derived from benzene, naphthalene, biphenyl, phthalimide, naphthalimide, or acridone.

(2) Radically Polymerizable Group

The resin dispersant according to the present invention has at least one radically polymerizable group. When the resin dispersant has a radically polymerizable group, for example, the glass transition temperature (Tg) of the resin dispersant may be lowered, and ejection recoverability may be improved when the ink composition is applied to an ink-jet method. Further, when the radically polymerizable group contained in the resin dispersant reacts with a polymerizable compound which may be included in the ink composition, for example, the formed image area may be more uniformly cured, and glossiness may be enhanced.

The radically polymerizable group may be introduced by a method in which a monomer having a radically polymerizable group precursor is used in polymerization, or may be introduced by a method in which a radically polymerizable group is introduced into the polymer by a polymer reaction.

The radically polymerizable group which can be used is not particularly limited as far as it is a radically polymerizable group described in literatures such as "KOBUNSHI DETA HANDOBUKKU (Polymer Data Handbook, edited by the Society of Polymer Science, Japan, BAIFUKAN Co., Ltd., 1986)", and the like. More specifically, it is preferable that the radically polymerizable group has a functional group (hereinafter, referred to as a radically polymerizable group) which has a carbon-carbon unsaturated bond and has a structure represented by the following Formula (A), (B), or (C).

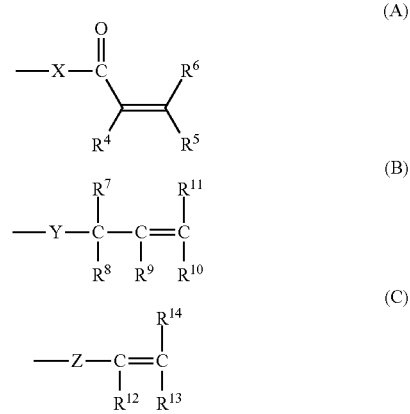

In Formulae (A) to (C), $R^4$ to $R^{14}$ each independently represent a hydrogen atom or a monovalent substituent; X and Y each independently represent an oxygen atom, a sulfur atom, or —$NR^{15}$—; and Z represents an oxygen atom, a sulfur atom, —$NR^{15}$—, or a phenylene group. Herein, $R^{15}$ represents a hydrogen atom or a monovalent organic group.

In Formula (A) above, $R^4$ to $R^6$ each independently represent a hydrogen atom or a monovalent substituent. $R^4$ may represent a hydrogen atom or an organic group such as an alkyl group which may have a substituent. Specifically, $R^4$ preferably represents a hydrogen atom, a methyl group, a methylalkoxy group, or a methyl ester group. $R^5$ and $R^6$ each independently represent a hydrogen atom, a halogen atom, an amino group, a dialkylamino group, a carboxy group, an alkoxycarbonyl group, a sulfo group, a nitro group, a cyano group, an alkyl group which may have a substituent, an aryl group which may have a substituent, an alkoxy group which may have a substituent, an aryloxy group which may have a substituent, an alkylamino group which may have a substituent, an arylamino group which may have a substituent, an alkylsulfonyl group which may have a substituent, or an arylsulfonyl group which may have a substituent. Among them, a hydrogen atom, a carboxy group, an alkoxycarbonyl group, an alkyl group which may have a substituent, and an aryl group which may have a substituent are preferable.

Herein, examples of the substituent which may be introduced into these groups include a methoxycarbonyl group, an ethoxycarbonyl group, an isopropyloxycarbonyl group, a methyl group, an ethyl group, and a phenyl group.

X represents an oxygen atom, a sulfur atom, or —$NR^{15}$—. Herein, $R^{15}$ may represent a hydrogen atom, an alkyl group which may have a substituent, or the like.

In Formula (B) above, $R^7$ to $R^{11}$ each independently represent a hydrogen atom or a monovalent substituent. $R^7$ and $R^{11}$ each independently represent, for example, a hydrogen atom, a halogen atom, an amino group, a dialkylamino group, a carboxy group, an alkoxycarbonyl group, a sulfo group, a nitro group, a cyano group, an alkyl group which may have a substituent, an aryl group which may have a substituent, an alkoxy group which may have a substituent, an aryloxy group which may have a substituent, an alkylamino group which may have a substituent, an arylamino group which may have a substituent, an alkylsulfonyl group which may have a substituent, or an arylsulfonyl group which may have a substituent. Among them, a hydrogen atom, a carboxy group, an alkoxycarbonyl group, an alkyl group which may have a substituent, and an aryl group which may have a substituent are preferable.

Examples of the substituent which may be introduced into these groups include those described as examples of the substituent which may be introduced in Formula (A).

Y represents an oxygen atom, a sulfur atom, or —$NR^{15}$—. $R^{15}$ may be any one of those described as examples of $R^{15}$ in Formula (A).

In Formula (C) above, $R^{12}$ to $R^{14}$ each independently represent a hydrogen atom or a monovalent substituent. Specifically, $R^{12}$ and $R^{14}$ each may represent, for example, a hydrogen atom, a halogen atom, an amino group, a dialkylamino group, a carboxy group, an alkoxycarbonyl group, a sulfo group, a nitro group, a cyano group, an alkyl group which may have a substituent, an aryl group which may have a substituent, an alkoxy group which may have a substituent, an aryloxy group which may have a substituent, an alkylamino group which may have a substituent, an arylamino group which may have a substituent, an alkylsulfonyl group which may have a substituent, or an arylsulfonyl group which may have a substituent. Among them, a hydrogen atom, a carboxy group, an alkoxycarbonyl group, an alkyl group which may have a substituent, and an aryl group which may have a substituent are preferable.

Examples of the substituent which may be introduced into these groups include those described as examples of the substituent which may be introduced in Formula (A).

Z represents an oxygen atom, a sulfur atom, —$NR^{15}$—, or a phenylene group. $R^{15}$ may be any one of those described as examples of $R^{15}$ in Formula (A).

The radically polymerizable resin dispersant having a structure represented by the above Formula (A) according to the present invention can be produced by at least one method of the following Synthesis Method <1> or <2>.

(Synthesis Method <1>)

A method in which a polymer compound is synthesized through polymerization using one or more of radically polymerizable compounds represented by the following Formula (D1) or Formula (D2), and then, by using a base, a proton is abstracted and $Z^1$ is eliminated to thus obtain a desired polymer compound.

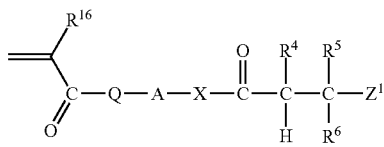
(D1)

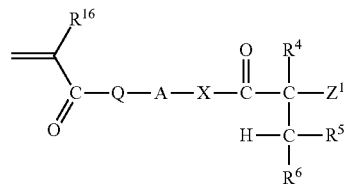
(D2)

In Formulae (D1) and (D2), $R^4$ to $R^6$ each have the same definitions as $R^4$ to $R^6$ in Formula (A), respectively. $Z^1$ represents an anionic leaving group. Q represents an oxygen atom, —NH—, or —NR$^{17}$— (wherein $R^{17}$ represents an alkyl group which may have a substituent). $R^{16}$ may represent a hydrogen atom, an alkyl group which may have a substituent, or the like. $R^{16}$ preferably represents a hydrogen atom, a methyl group, a methylalkoxy group, or a methyl ester group. A represents a divalent organic linking group. X has the same definitions as X in Formula (A).

Examples of the radically polymerizable compound represented by Formula (D1) or Formula (D2) include the following compounds, while the scope of the invention is not limited thereto.

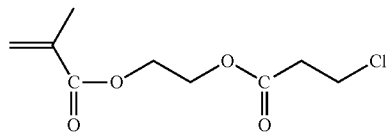
(M-101)

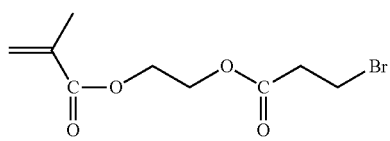
(M-102)

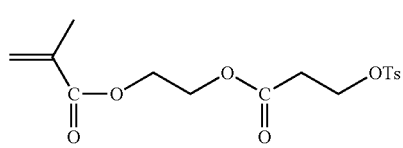
(M-103)

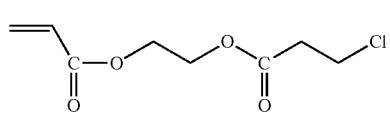
(M-104)

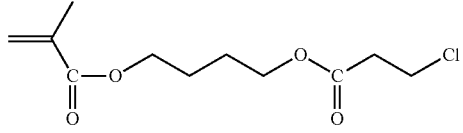
(M-105)

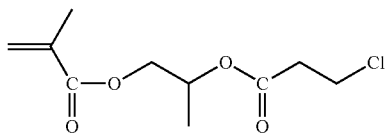
(M-106)

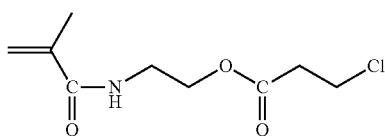
(M-107)

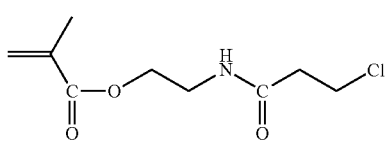
(M-108)

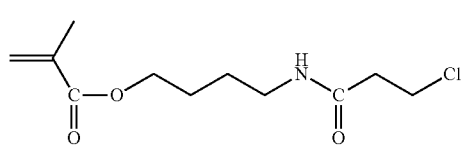
(M-109)

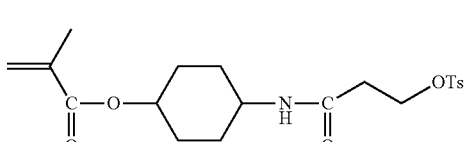
(M-110)

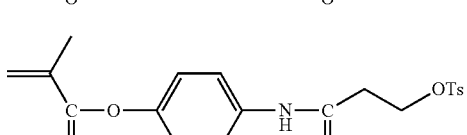
(M-111)

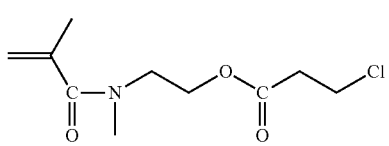
(M-112)

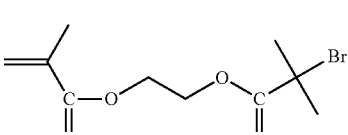
(M-113)

These radically polymerizable compounds represented by Formula (D1) or Formula (D2) may be readily commercially available, or alternatively readily obtainable according to a synthesis method shown in the synthesis example described below. The group represented by Formula (A) can be introduced in such a manner that a polymer compound is synthesized according to a general radical polymerization method using one of more of the radically polymerizable compounds represented by Formula (D1) or Formula (D2) and, as necessary, other radically polymerizable compound, and then a desired amount of a base is added dropwise to the polymer solution under cooling or heating condition to allow to react, and as necessary, neutralizing treatment is performed using an acid. For production of the polymer compound, a generally known suspension polymerization method or solution polymerization method may be employed.

The base which is used may be either an inorganic compound (inorganic base) or an organic compound (organic base). Preferable examples of the inorganic base include sodium hydroxide, potassium hydroxide, sodium carbonate, sodium hydrogencarbonate, potassium carbonate, and potassium hydrogencarbonate. Preferable examples of the organic base include metal alkoxides such as sodium methoxide, sodium ethoxide, and potassium t-butoxide, and organic amine compounds such as triethylamine, pyridine, diisopropylethylamine, and DBU (1,8-diazabicyclo[5,4,0]undec-7-ene).

(Synthesis Method <2>)

A method in which a stem polymer compound (which is a polymer compound that forms the main chain) is synthesized through polymerization using one or more radically polymerizable compounds having a specific functional group, and then the functional group in a side chain of the stem polymer compound is allowed to react with a compound having a structure represented by the following Formula (E) to thus obtain a desired polymer compound.

Formula (E)

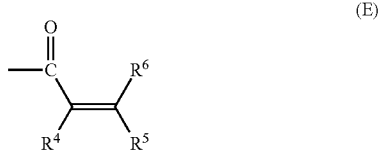

(E)

$R^4$ to $R^6$ in Formula (E) each have the same definitions as $R^4$ to $R^6$ in Formula (A), respectively.

Examples of the functional group of the radically polymerizable compound having a specific functional group, which is used for the synthesis of the stem polymer compound in the Synthesis Method <2>, include a hydroxy group, a carboxy group, a carboxylic halide group, a carboxylic anhydride group, an amino group, an alkyl halide group, an isocyanato group, and an epoxy group. Specific examples of the radically polymerizable compound having such a functional group include 2-hydroxyethyl acrylate, 2-hydroxyethyl methacrylate, 4-hydroxybutyl acrylate, 4-hydroxybutyl methacrylate, acrylic acid, methacrylic acid, acryloyl chloride, methacryloyl chloride, methacrylic anhydride, N,N-dimethyl-2-aminoethyl methacylate, 2-chloroethyl methacrylate, 2-isocyanatoethyl methacrylate, glycidyl acrylate, and glycidyl methacrylate.

A desired polymer compound can be obtained through polymerizing one or more of such radically polymerizable compounds having a specific functional group and, as necessary, copolymerizing with other radically polymerizable compound to thus synthesize a stem polymer compound, and then allowing a reaction with a compound having a group represented by the above Formula (E). Herein, examples of the compound having a group represented by Formula (E) include the compounds listed above as the specific examples of the radically polymerizable compound having such a functional group.

The radically polymerizable resin dispersant having a structure represented by the above Formula (B) according to the present invention can be produced by at least one method of the following Synthesis Method <3> or <4>.

(Synthesis Method <3>)

A method in which a polymer compound is obtained through polymerization using one or more radically polymerizable compounds having an unsaturated group represented by Formula (B) and an ethylenically unsaturated group which has higher addition polymerizability than that of the unsaturated group represented by Formula (B), and further, as necessary, other radically polymerizable compound(s). This method is a method in which a compound having plural ethylenically unsaturated groups of different addition polymerizability in one molecule, for example, allyl methacrylate, is used.

Examples of the radically polymerizable compounds having an unsaturated group represented by Formula (B) and an ethylenically unsaturated group which has higher addition polymerizability than that of the unsaturated group represented by Formula (B), include allyl acrylate, allyl methacrylate, 2-allyloxyethyl acrylate, 2-allyloxyethyl methacrylate, propargyl acrylate, propargyl methacrylate, N-allyl acrylamide, N-allyl methacrylamide, N,N-diallyl acrylamide, N,N-diallyl methacrylamide, allylacrylate, and allylmethacrylate.

(Synthesis Method <4>)

A method in which a polymer compound is synthesized through polymerization using one or more radically polymerizable compounds having a functional group, and then a group represented by Formula (B) is introduced through allowing a reaction between the functional group in a side chain of the polymer compound and a compound having a structure represented by the following Formula (F).

Formula (F)

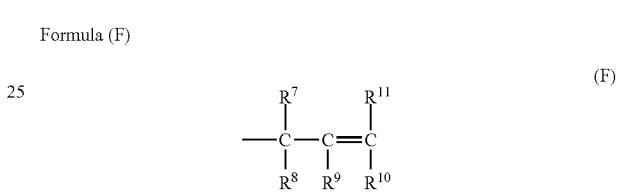

(F)

$R^7$ to $R^{11}$ in Formula (F) each have the same definitions as $R^7$ to $R^{11}$ in the above Formula (B), respectively.

Specific examples of the radically polymerizable compound having a functional group in the Synthesis Method <4> include those described as the specific examples of the radically polymerizable compound having a functional group described above in the Synthesis Method <2>.

Examples of the compound having a structure represented by Formula (F) include allyl alcohol, allylamine, diallylamine, 2-allyloxyethanol, 2-chloro-1-butene, and allyl isocyanate.

The radically polymerizable resin dispersant having a structure represented by the above Formula (C) according to the present invention can be produced by at least one method of the following Synthesis Method <5> or <6>.

(Synthesis Method <5>)

A method in which a polymer compound is obtained through copolymerization using one or more radically polymerizable compounds having an unsaturated group represented by Formula (C) and an ethylenically unsaturated group which has higher addition polymerizability than that of the unsaturated group represented by Formula (C), and further, as necessary, other radically polymerizable compound.

Examples of the radically polymerizable compounds having an unsaturated group represented by Formula (C) and an ethylenically unsaturated group which has higher addition polymerizability than that of the unsaturated group represented by Formula (C), include vinyl acrylate, vinyl methacrylate, 2-phenylvinyl acrylate, 2-phenylvinyl methacrylate, 1-propenyl acrylate, 1-propenyl methacrylate, vinylacrylamide, and vinylmethacrylamide.

(Synthesis Method <6>)

A method in which a polymer compound is synthesized through polymerization using one or more radically polymerizable compounds having a functional group, and then a group represented by Formula (C) is introduced through allowing a reaction between the functional group in a side chain of the polymer compound and a compound having a structure represented by the following Formula (G).

Formula (G)

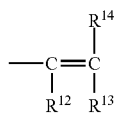

$R^{12}$ to $R^{14}$ in Formula (G) each have the same definitions as $R^{12}$ to $R^{14}$ in the above Formula (C), respectively.

Specific examples of the radically polymerizable compound having a functional group in the Synthesis Method <6> include those described as the specific examples of the radically polymerizable compound having a functional group described above in the Synthesis Method <2>.

Examples of the compound having a structure represented by Formula (G) include 2-hydroxyethyl monovinyl ether, 4-hydroxybutyl monovinyl ether, diethylene glycol monovinyl ether, and 4-chloromethylstyrene.

Among these structural units including a radically polymerizable group, structural units including a radically polymerizable group having a structure represented by the above Formula (A) or Formula (B) are preferable. In particular, structural units including a radically polymerizable group having a structure represented by the above Formula (A) are preferable, and further, those in which $R^4$ represents a hydrogen atom or a methyl group and X represents an oxygen atom or a nitrogen atom are most preferable.

Preferable specific examples of the structural unit including a radically polymerizable group having a structure represented by the above Formula (A), (B), or (C) are shown below.

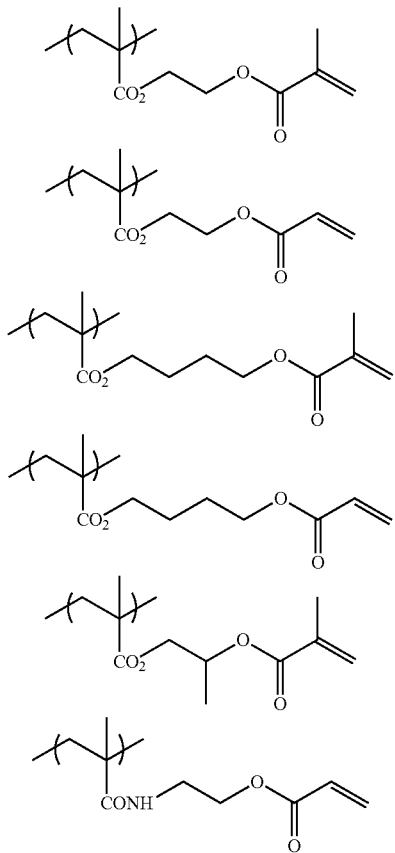

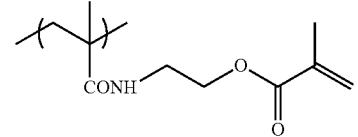
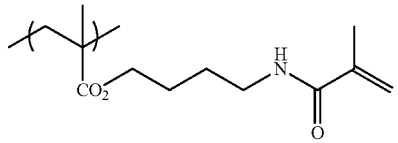
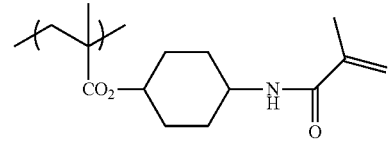
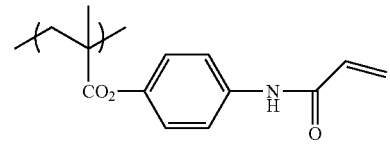
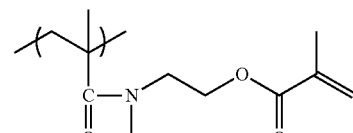
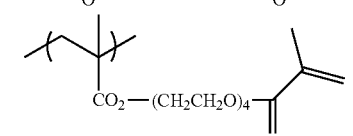
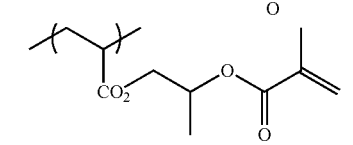
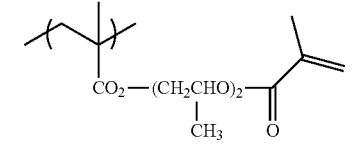
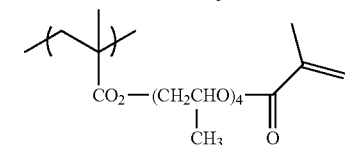
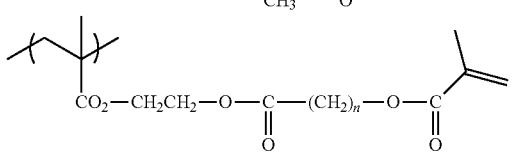

n = 4 or 5

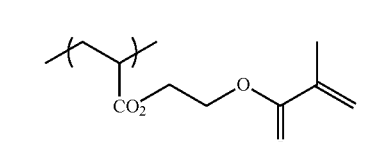
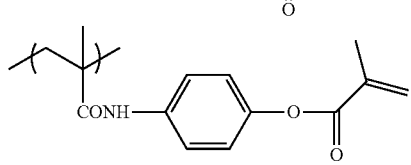

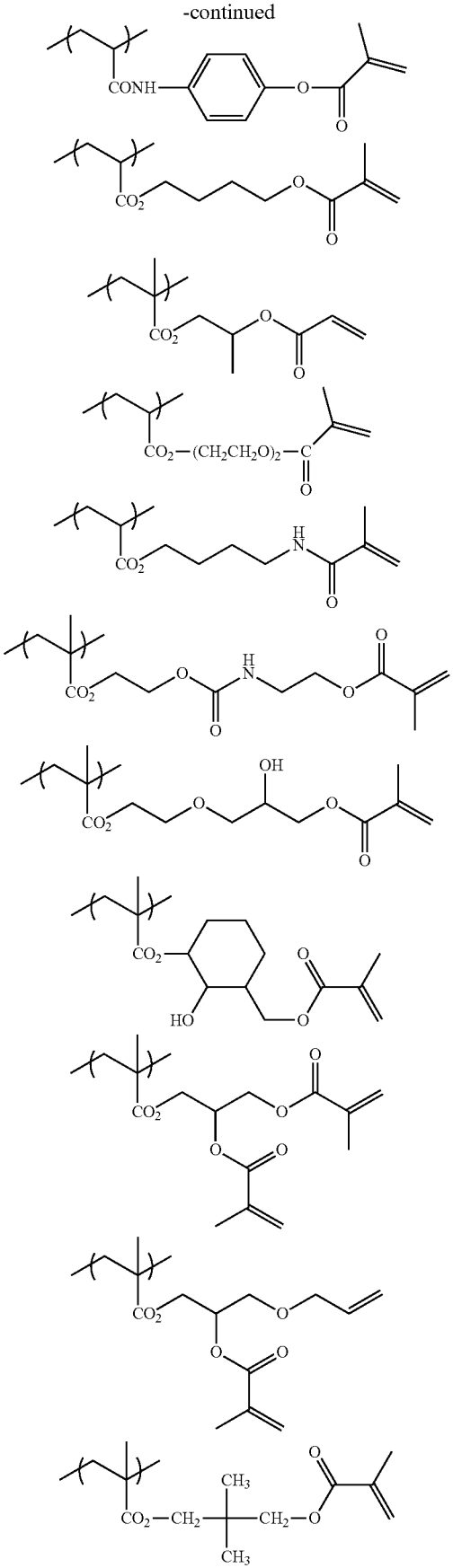

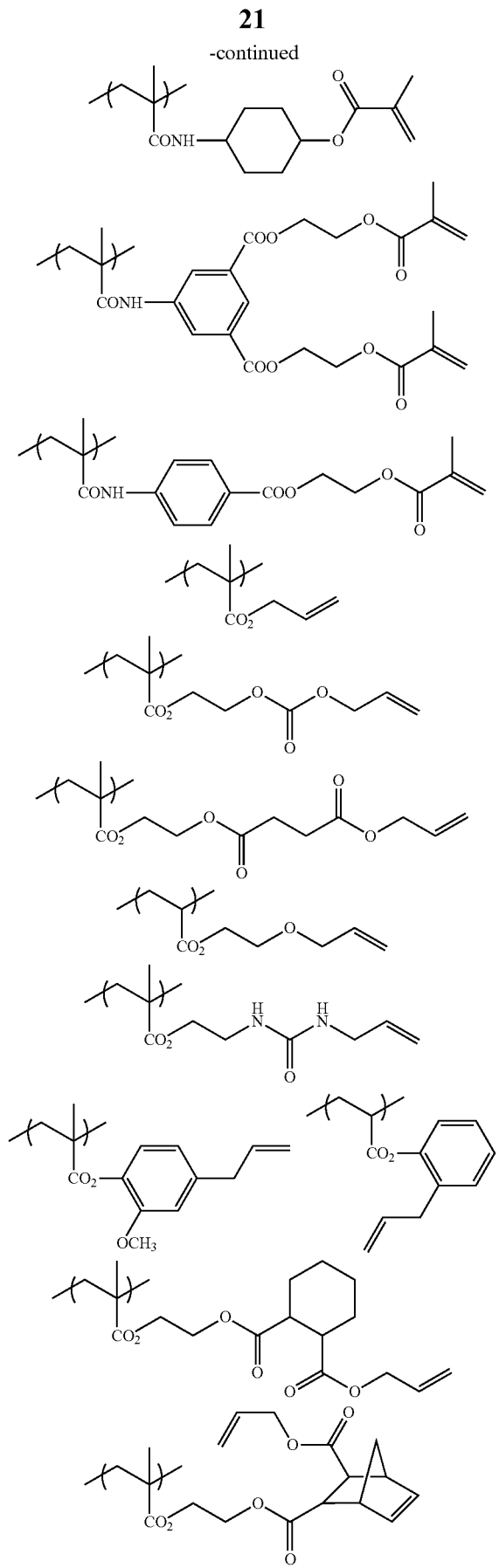

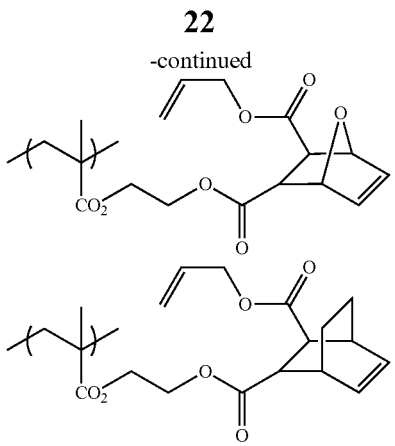

One kind of the structural units having a radically polymerizable group may incorporated in the resin dispersant, or two or more kinds thereof may be incorporated in the resin dispersant.

The content of the structural unit having a radically polymerizable group in the resin dispersant according to the present invention is appropriately determined depending on its structure, design of the ink composition, or the like, while the content is preferably from 1% by mass to 90% by mass, more preferably from 5% by mass to 70% by mass, and even more preferably from 10% by mass to 60% by mass. When the content of the structural unit having a radically polymerizable group is 1% by mass or more, curability at the time of curing is improved so that an image with high strength may be obtained. When the content of the structural unit having a radically polymerizable group is 90% by mass or less, aggregation or increase in viscosity in the colored particle dispersion may be suppressed and stability may be enhanced.

It is preferred that the resin dispersant in the present invention further contains at least one hydrophilic structural unit, in addition to the (1) structural unit containing at least one aromatic partial structure derived from a compound selected from the group consisting of an aromatic hydrocarbon compound, a condensed ring aromatic hydrocarbon compound, an aromatic heterocyclic compound, a condensed ring aromatic heterocyclic compound, and a compound containing two or more aromatic hydrocarbon compounds linked to each other, and the (2) structural unit containing a radically polymerizable group, from the viewpoints of dispersibility for fine dispersion and dispersion stability.

[Hydrophilic Structural Unit]

Examples of the hydrophilic structural unit include a hydrophilic structural unit containing at least one selected from the group consisting of an ionic group and a nonionic group. Examples of the ionic group include a cationic dissociative group such as a tertiary amino group, and an anionic dissociative group such as a carboxy group, a sulfo group, or a phosphate group. Examples of the nonionic hydrophilic group include a hydroxy group and a polyalkyleneoxy group (preferably, a polyethyleneoxy group).

The resin dispersant according to the present invention preferably contains at least one hydrophilic structural unit having an ionic group, more preferably contains at least one hydrophilic structural unit having an anionic group, and even more preferably contains at least one hydrophilic structural unit having a carboxy group.

The hydrophilic structural unit having an ionic group may be formed by copolmerization using a monomer having an ionic group. Examples of the monomer having an ionic group include an anionic group-containing monomer and a cationic group-containing monomer.

Further, the hydrophilic structural unit having an ionic group may be also formed by preparing a polymer by polymerization, followed by introducing an ionic group into a polymer chain thereof.

Examples of the cationic group-containing monomer include an unsaturated tertiary amine-containing vinyl monomer and an unsaturated ammonium salt-containing vinyl monomer.

Specific examples of the unsaturated tertiary amine-containing vinyl monomer include N,N-dimethylaminoethyl (meth)acrylate, N,N-dimethylaminopropyl(meth)acrylate, N,N-diethylaminoethyl(meth)acrylate, N,N-dimethylaminopropyl(meth)acrylamide, vinylpyrrolidone, 2-vinylpyridine, 4-vinylpyridine, 2-methyl-6-vinylpyridine, and 5-ethyl-2-vinylpyridine.

Specific examples of the unsaturated ammonium salt-containing vinyl monomer include quaternized N,N-dimethylaminoethyl(meth)acrylate, quaternized N,N-diethylaminoethyl(meth)acrylate, and quaternized N,N-dimethylaminopropyl(meth)acrylate.

"(Meth)acrylate" means acrylate or methacrylate, and "(meth)acrylamide" means acrylamide or methacrylamide.

Examples of the anionic group-containing monomer may include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, meleic acid, fumaric acid, citraconic acid, and 2-methacryloyloxy ethyl succinate.

Specific examples of the unsaturated sulfonic acid monomer include styrenesulfonic acid, 2-acrylamido-2-methylpropanesulfonic acid, 3-sulfopropyl(meth)acrylate, and bis(3-sulfopropyl)itaconate.

Specific examples of the unsaturated phosphoric acid monomer include vinylphosphonic acid, vinylphosphate, bis(methacryloyloxyethyl) phosphate, diphenyl-2-acryloyloxyethyl phosphate, diphenyl-2-methacryloyloxyethyl phosphate, and dibutyl-2-acryloyloxyethyl phosphate.

Among the above-described monomers having an ionic group, a monomer having an anionic group is preferred, and a monomer having a carboxy group is more preferred, from the viewpoints of dispersibility and stability of the colorant.

The monomers having an ionic group may be used alone or as a mixture of two or more of them.

The content of the hydrophilic structural unit containing an ionic group in the resin dispersant is preferably 1% by mass or more but less than 80% by mass, more preferably 2% by mass or more but less than 70% by mass, and particularly preferably 3% by mass or more but less than 60% by mass, with respect to the total mass of the resin dispersant. When the content of the hydrophilic structural unit is 1% by mass or more, charge repulsive property in the water dispersion liquid may be high, and pigment in a fine size may be obtained, and dispersion stability may be excellent. When the content is less than 80%, the solubility in water of the dispersant may be kept low, and desorption of the dispersant from the pigment surface may be less likely to occur, so that dispersion stability may be excellent.

When the resin dispersant according to the present invention contains an acidic group such as a carboxy group, an acid value of the resin dispersant is preferably 5 mgKOH/g or more but less than 500 mgKOH/g, more preferably 10 mgKOH/g or more but less than 450 mgKOH/g, and particularly preferably 15 mgKOH/g or more but less than 400 mgKOH/g. When the acid value of the resin dispersant in the case of containing an acidic group such as a carboxy group or the like is 5 mgKOH/g or more, the charge repulsive property of the dispersion caused by dissociated carboxy groups may be good, and dispersibility may be excellent. When the acid value of the polymer is 500 mgKOH/g or less, the hydrophilicity of the resin dispersant may be kept low, the resin dispersant may more easily be adsorbed to the colorant, and elution of the resin dispersant into the aqueous medium may be reduced.

It should be noted that the acid value is defined herein as the mass (mg) of KOH necessary for completely neutralizing 1 g of the polymer (resin dispersant), and is a value measured in accordance with the method described in Japanese Industrial Standards (JIS K 0070: 1992), the disclosure of which is incorporated by reference herein.

The structural unit having a nonionic hydrophilic group described above can be formed by using a monomer that corresponds to the structural unit in polymerization, but may be formed by preparing a polymer that forms the resin dispersant by polymerization, followed by introducing a nonionic hydrophilic functional group into a polymer chain thereof.

The monomer which forms the above structural unit having a nonionic hydrophilic group is not particularly limited as far as the monomer has a functional group capable of forming a polymer and a nonionic hydrophilic functional group. Any known monomers can be used, but vinyl monomers are preferable from the viewpoints of availability, handling property, and versatility.

Examples of the vinyl monomers include (meth)acrylates having a hydrophilic functional group, (meth)acrylamides, and vinyl esters. Examples of the hydrophilic functional group include a hydroxy group, an amido group (in which the nitrogen atom is not substituted (i.e. which does not have a substituent on the nitrogen atom)), and an alkylene oxide polymer such as polyethylene oxide or polypropylene oxide as described below. Among the examples of the vinyl monomers, hydroxyethyl(meth)acrylate, hydroxybutyl(meth)acrylate, (meth)acrylamide, and (meth)acrylate containing an alkylene oxide polymer are particularly preferable.

It is preferable that the structural unit having a nonionic hydrophilic group contains a hydrophilic structural unit having an alkylene oxide polymer structure. The alkylene moiety of the alkylene oxide polymer preferably has from 1 to 6 carbon atoms, more preferably from 2 to 6 carbon atoms, and particularly preferably from 2 to 4 carbon atoms, from the viewpoints of hydrophilicity and hydrophobicity. Further, the polymerization degree of the alkylene oxide polymer is preferably from 1 to 120, more preferably from 1 to 60, and particularly preferably from 1 to 30.

In a preferable embodiment, the structural unit having a nonionic hydrophilic group is a hydrophilic structural unit containing a hydroxy group. The number of the hydroxy group in the structural unit is not particularly limited, and is preferably from 1 to 4, more preferably from 1 to 3, and particularly preferably from 1 to 2, from the viewpoints of hydrophilicity and hydrophobicity of the colorant dispersing resin and compatibility with solvent or other monomer at the time of polymerization.

The resin dispersant in the present invention may contain other hydrophobic structural unit, in addition to the (1) structural unit containing at least one aromatic partial structure described above, the (2) structural unit containing a radically polymerizable group, and the above hydrophilic structural unit. The other hydrophobic structural unit may be introduced through copolymerization in which a corresponding copolymerization component having a hydrophobic group is used. Alternatively, a hydrophobic functional group may be introduced into the polymer chain after polymerization.

The copolymerization component that forms the other hydrophobic structural unit is not limited as far as it is a monomer capable of performing radical polymerization, and any conventionally known monomer can be used. Specifically, examples thereof include monomers described in "KOBUNSHI DETA HANDOBUKKU—KISO HEN— (Polymer Data Handbook—Fundamental Step—)" (edited by the Society of Polymer Science, Japan, BAIFUKAN Co., Ltd., 1986). Such copolymerization components may be used alone or in a combination of two or more of them.

From the viewpoints of availability, handling property, and versatility, vinyl monomers (for example, (meth)acrylates, (meth)acrylamides, styrenes, and vinyl esters) are preferable, as the monomer that forms the other hydrophobic structural unit.

Concerning the vinyl monomers preferably used as the monomer that forms the other hydrophobic structural unit, specific examples of (meth)acrylates include alkyl(meth)acrylates such as methyl(meth)acrylate, ethyl(meth)acrylate, (iso)propyl(meth)acrylate, (iso, or t-)butyl(meth)acrylate, 2-ethylhexyl(meth)acrylate, (iso)octyl(meth)acrylate, (iso)decyl(meth)acrylate, and (iso)stearyl(meth)acrylate. Among them, alkyl(meth)acrylates having from 1 to 6 carbon atoms are preferable. Specific examples of (meth)acrylamides include (meth)acrylamide, N-methyl(meth)acrylamide, N-ethyl(meth)acrylamide, N-propyl(meth)acrylamide, N-isopropyl(meth)acrylamide, N-n-butyl(meth)acrylamide, N-t-butyl(meth)acrylamide, N-cyclohexyl(meth)acrylamide, N-(2-methoxyethyl)(meth)acrylamide, N,N-dimethyl(meth)acrylamide, N,N-diethyl(meth)acrylamide, vinyl(meth)acrylamide, N,N-diallyl(meth)acrylamide, and N-allyl(meth)acrylamide. (Meth)acrylamide and N,N-dimethyl(meth)acrylamide are preferable. Specific examples of styrenes include styrene, methylstyrene, dimethylstyrene, trimethylstyrene, ethylstyrene, isopropylstyrene, n-butylstyrene, t-butylstyrene, methoxystyrene, butoxystyrene, acetoxystyrene, chlorostyrene, dichlorostyrene, bromostyrene, chloromethylstyrene, hydroxystyrene protected with a group (for example, t-BOC (t-butoxycarbonyl group), or the like) capable of being eliminated with an acidic substance, methyl vinylbenzoate, α-methylstyrene, and vinylnaphthalene. Among them, styrene and α-methylstyrene are preferable. Specific examples of vinyl esters include vinyl acetate, vinyl chloroacetate, vinyl propionate, vinyl butyrate, vinyl methoxyacetate, and vinyl benzoate. Among them, vinyl acetate is preferable.

It is preferred that the resin dispersant according to the invention includes 5% by mass to 50% by mass of the above structural unit containing an aromatic partial structure, 5% by mass to 70% by mass of the above structural unit containing a radically polymerizable group, and 2% by mass to 70% by mass of the hydrophilic structural unit having an anionic group. It is more preferred that the resin dispersant includes 5% by mass to 40% by mass of the structural unit represented by the above Formula (1), 10% by mass to 60% by mass of the above structural unit containing a radically polymerizable group, and 3% by mass to 60% by mass of the hydrophilic structural unit having an anionic group.

The range of molecular weight of the polymer contained in the resin dispersant, which is used in the invention, is preferably from 1,000 to 1,000,000, more preferably from 2,000 to 500,000, and even more preferably from 3,000 to 150,000, in terms of weight average molecular weight (Mw).

It is preferable that the molecular weight is within the above range, from the viewpoints that the polymer tends to exhibit a good steric repulsion effect as a dispersant and that the steric effect offers a tendency of taking less time for adsorption to a colorant.

Further, the polymer preferably has a molecular weight distribution (denoted by weight average molecular weight value/number average molecular weight value) of from 1 to 6, and more preferably from 1 to 4.

It is preferable that the molecular weight distribution is within the above range, from the viewpoints of reducing the time for dispersing the pigment and improving stability of the dispersion over time. Here, the number average molecular weight and the weight average molecular weight are molecular weights detected by using solvent THF (tetrahydrofuran) and a differential refractometer through a GPC (gel permeation chromatography) analyzer with the use of columns of TSKgel GMHxL, TSKgel G4000HxL, and TSKgel G2000HxL (all trade names, manufactured by Tosoh Corp.). For the conversion, styrene was used as a standard reference material.

The resin dispersant in the invention may have a structure of a branched polymer such as a graft polymer, a comb polymer, or a star polymer. Further, the resin dispersant in the invention may be a random copolymer having the respective structural units introduced irregularly, or may be a block copolymer having the respective structural units introduced regularly. When the resin dispersant is a block copolymer, the respective structural units may be introduced in any order in synthesis, and the same constituent component may be used twice or more times. It is preferable that the resin dispersant is a random copolymer from the viewpoints of versatility and productivity.

The resin for dispersing the colorant, which is used in the invention, may be synthesized by a method selected from various polymerization methods including solution polymerization, precipitation polymerization, suspension polymerization, bulk polymerization, and emulsion polymerization. The polymerization reaction can be carried out by a known operation such as a batch, semi-continuous, or continuous operation.

Examples of a method for initiating polymerization include a method of using a radical initiator and a method of irradiating with light or radioactive rays. These polymerization methods and methods for initiating polymerization are described in, for example, "Kobunshi Gosei Hoho (Polymer Synthesis Method)" by Teiji Tsuruta, revised edition (published by Nikkan Kogyo Shimbun, Ltd., 1971) and "Kobunshi Gosei no Jikkenho (Experimental Method of Polymer Synthesis)" written by Takayuki Ohtsu and Masaetsu Kinoshita, published by Kagaku-Dojin Publishing Co., Inc. in 1972, pages 124 to 154.

Among the above polymerization methods, a solution polymerization method using a radical initiator is particularly preferable. Examples of the solvent used in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These organic solvents may be used alone or as a mixture of two or more of them, or may be mixed with water to give a mixture solvent.

The temperature for polymerization should be set in relation to the molecular weight of the intended polymer, the kind of the initiator, and the like, while it is usually from about 0°

C. to about 100° C., and it is preferable that polymerization is carried out under the temperature of from 50° C. to 100° C.

The reaction pressure may be appropriately selected, while it is usually from 1 kg/cm$^2$ to 100 kg/cm$^2$, and is particular preferably from about 1 kg/cm$^2$ to about 30 kg/cm$^2$. The reaction time may be from about 5 hours to about 30 hours. The obtained polymer may be subjected to purification such as reprecipitation.

Preferable specific examples of the polymer contained in the resin dispersant in the invention are shown below, while the scope of the invention is not limited to these examples. Note that, a, b, c, and d in the specific examples each represent a content ratio (on the basis of mass) of each structural unit in the polymer, and specific examples of the content ratio are shown in Table 1 described below. Examples of weight average molecular weights (hereinafter, may be simply referred to as "molecular weights") of these polymers are also shown in Table 1. It should be noted that, in the exemplary compound P-4, n is approximately 4.

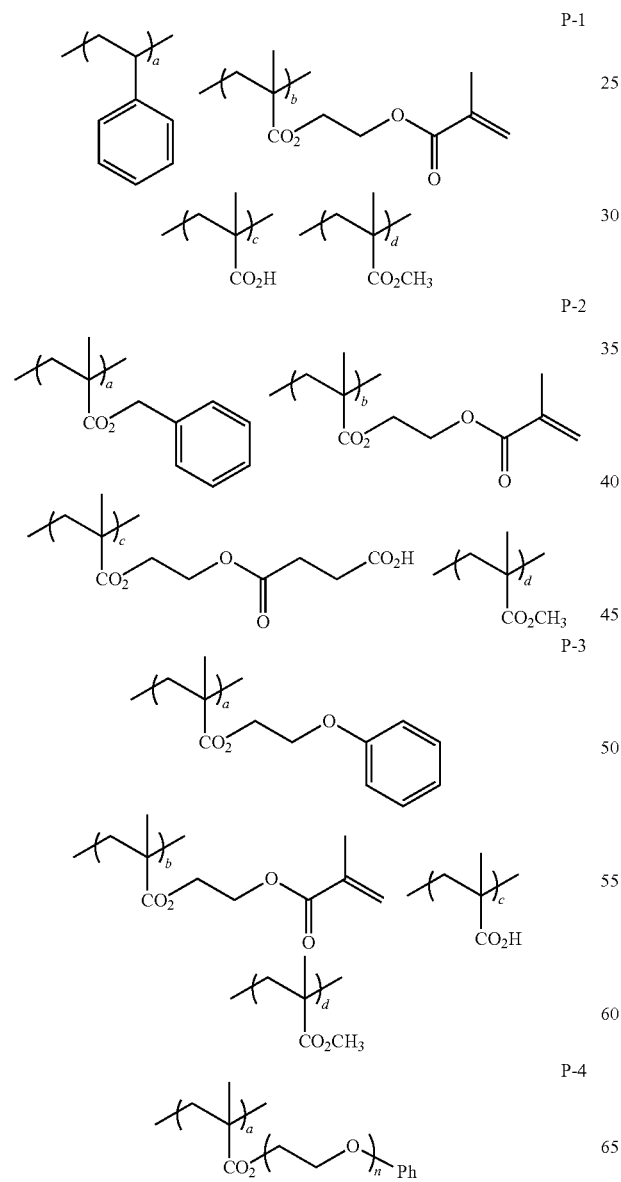

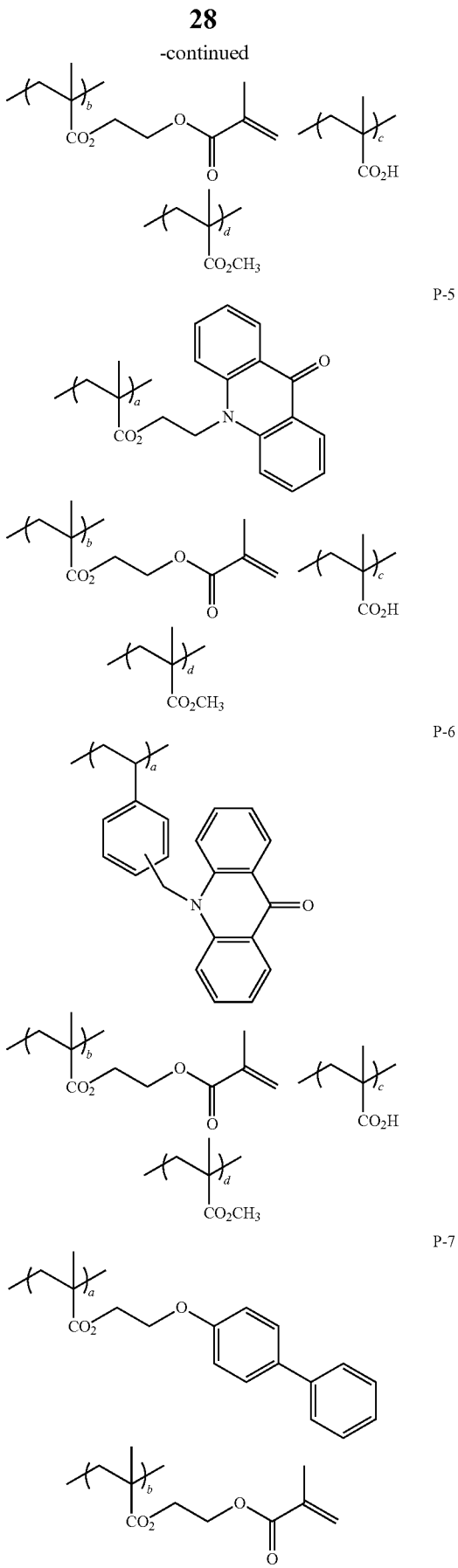

-continued
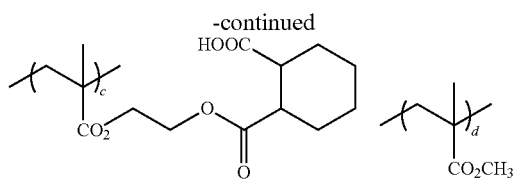
P-8
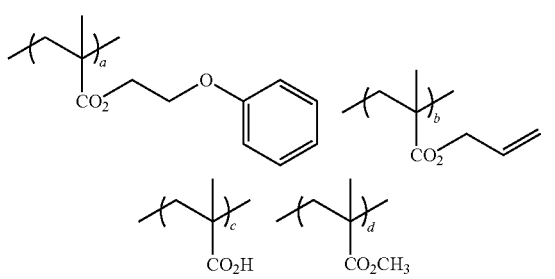
P-9
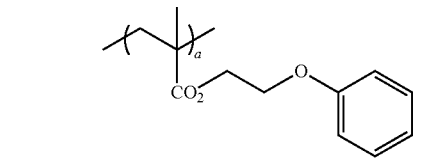
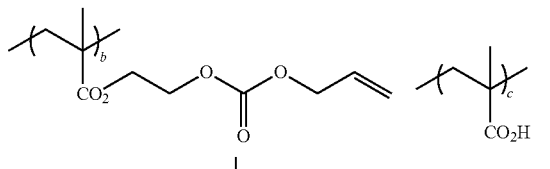
P-10
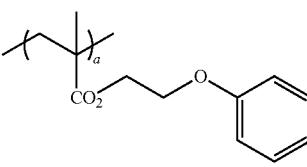
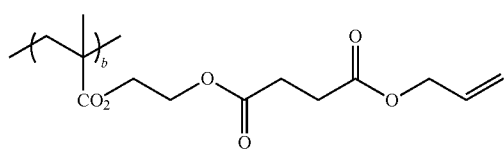
P-11
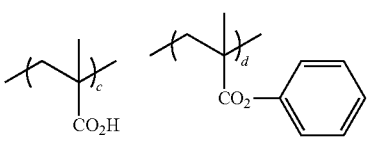
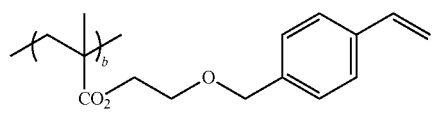
-continued
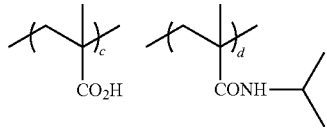
P-12
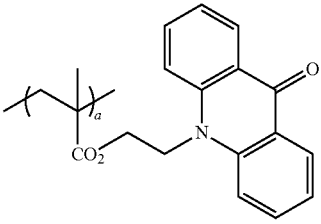
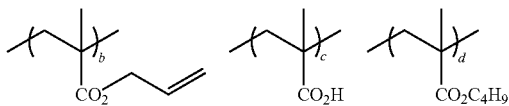
P-13
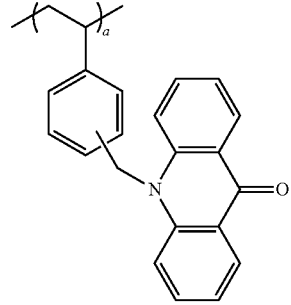
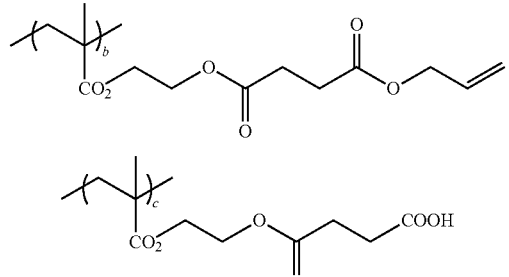
P-14
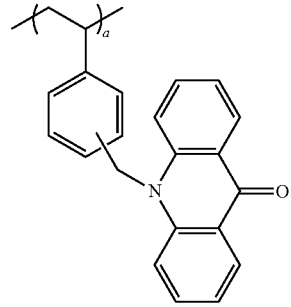
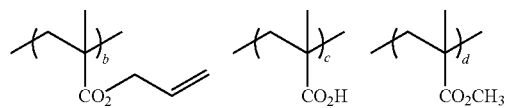

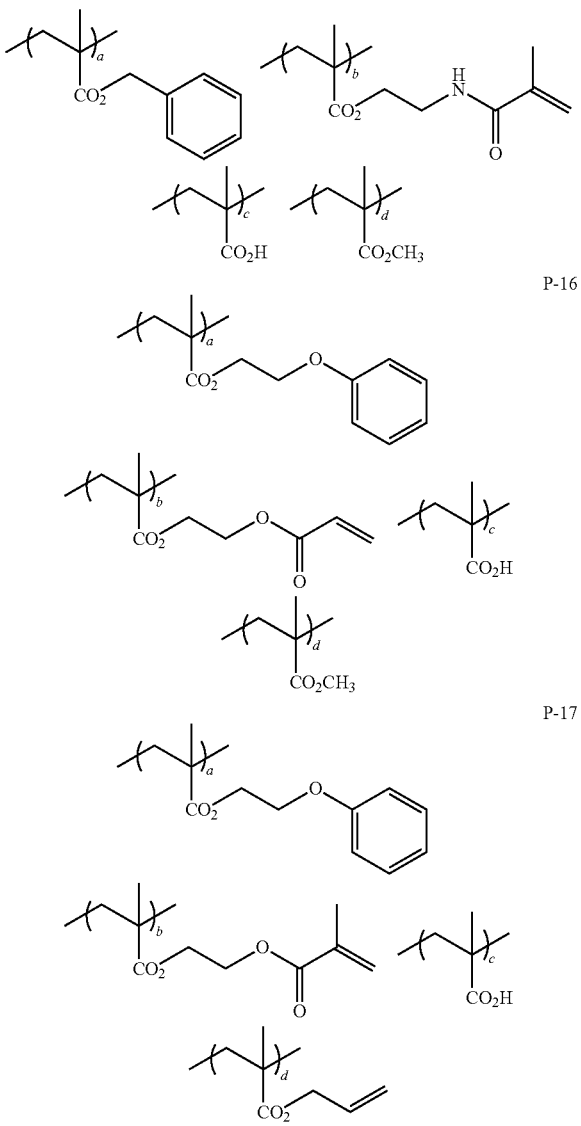

TABLE 1-continued

| Resin Dispersant | Structural Unit Ratio a | b | c | d | Weight Average Molecular Weight (×10⁴) |
|---|---|---|---|---|---|
| P-15 | 40 | 30 | 10 | 20 | 8.6 |
| P-16 | 50 | 20 | 15 | 15 | 6.3 |
| P-17 | 50 | 25 | 10 | 15 | 5.8 |

The content ratio of the resin dispersant in the invention is not particularly limited, while the mixing ratio of the colorant described below and the resin dispersant (colorant:resin dispersant; on the basis of mass) is preferably in a range of from 1:0.06 to 1:3, more preferably in a range of from 1:0.125 to 1:2, and even more preferably from 1:0.125 to 1:1.5.

(Colorant)

The colored particles in the present invention preferably include at least one colorant.

As the colorant, a known dye or pigment can be used without any particular limitation. From the viewpoint of ink coloring property, a colorant which is substantially insoluble or slightly soluble in water is preferable. Specific examples of such colorant include various pigments, disperse dyes, oil-soluble dyes, and dyes that form J-aggregates. Pigments are more preferable from the viewpoint of lightfastness.

The pigment used in the invention is not particularly limited and may be appropriately selected according to the purposes. For example, any of an organic pigment and an inorganic pigment may be used.

Examples of the organic pigment include an azo pigment, a polycyclic pigment, dye chelate, a nitro pigment, a nitroso pigment, and aniline black. Among them, an azo pigment, a polycyclic pigment, and the like are preferable. Examples of the azo pigment include azo lake, an insoluble azo pigment, a condensed azo pigment, and a chelate azo pigment. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the dye chelate include a basic dye chelate and an acidic dye chelate.

Examples of the inorganic pigment include titanium oxide, iron oxide, calcium carbonate, barium sulfate, aluminum hydroxide, barium yellow, cadmium red, chrome yellow, and carbon black. Among them, carbon black is particularly preferable. The carbon black may be produced by a known method, for example, a contact method, a furnace method, a thermal method, or the like.

Specific examples of the pigment which can be used in the invention include the pigments described in paragraphs [0142] to [0145] of JP-A No. 2007-100071.

Among them, from the viewpoints of coloring property and hue, C.I. Pigment Yellow 74 (PY 74) is preferred as a pigment included in an ink having a yellow hue; C.I. Pigment RED 122 (PR 122) is preferred as a pigment included in an ink having a magenta hue; and C.I. Pigment Blue 15:3 (PB 15:3) is preferred as a pigment included in an ink having a cyan hue. Further, carbon black is preferred as a pigment included in an ink having a black hue.

The above pigments may be used alone or in a combination of two or more of them.

The content of the colorant in the ink composition is preferably from 0.1% by mass to 20% by mass, more preferably from 0.2% by mass to 15% by mass, and particularly prefer-

TABLE 1

| Resin Dispersant | Structural Unit Ratio a | b | c | d | Weight Average Molecular Weight (×10⁴) |
|---|---|---|---|---|---|
| P-1 | 40 | 30 | 15 | 15 | 5.6 |
| P-2 | 60 | 20 | 15 | 5 | 12.3 |
| P-3 | 50 | 20 | 15 | 15 | 5.3 |
| P-4 | 40 | 30 | 10 | 20 | 3.6 |
| P-5 | 20 | 35 | 15 | 30 | 4.6 |
| P-6 | 20 | 40 | 10 | 30 | 3.4 |
| P-7 | 70 | 10 | 10 | 10 | 13.2 |
| P-8 | 40 | 30 | 15 | 15 | 7.6 |
| P-9 | 40 | 30 | 20 | 10 | 8.3 |
| P-10 | 60 | 20 | 10 | 10 | 2.3 |
| P-11 | 40 | 30 | 15 | 15 | 8.6 |
| P-12 | 15 | 50 | 15 | 20 | 5.6 |
| P-13 | 20 | 30 | 15 | 35 | 2.6 |
| P-14 | 15 | 50 | 10 | 25 | 9.7 | ably from 0.5% by mass to 10% by mass, with respect to the total mass of solid matters in the ink composition, from the viewpoints of ink coloring property, storage stability, and the like.

~Method for Producing Colored Particles~

The colored particles according to the present invention can be produced as a dispersion by, for example, a method including adding an aqueous solution containing a basic substance to a mixture containing the above colorant, the above resin dispersant, and an organic solvent which dissolves or disperses the resin dispersant (a mixing and hydration process) and then, removing the organic solvent therefrom (a solvent removal process).

In the present invention, a colored particle dispersion in which the colorant is finely dispersed, and which has excellent storage stability, can be produced.

It is necessary that the organic solvent can dissolve or disperse the resin dispersant. In addition, it is preferable that the organic solvent has a certain degree of affinity to water. Specifically, an organic solvent having a solubility in water at 20° C. of from 10% by mass to 50% by mass is preferable.

More specifically, the colored particle dispersion can be produced by the following production method including process (1) and process (2), but the invention is not limited thereto.

Process (1): A process of dispersing a mixture containing a colorant, a resin dispersant, an organic solvent which dissolves or disperses the resin dispersant, as well as a solution containing a basic substance and water as a main component Process (2): A process of removing at least a part of the organic solvent In process (1) above, first, a resin dispersant is dissolved or dispersed in an organic solvent to obtain a mixture (a mixing process). Subsequently, a colorant, a solution containing a basic substance and water as a main component, water, and if necessary, a surfactant or other additive are added and mixed to the mixture, and the resulting mixture is dispersed to obtain an oil-in-water type dispersion.

The basic substance is used to neutralize anionic groups (preferably, carboxy groups) which may be incorporated in the resin dispersant. The degree of neutralization of the anionic groups is not particularly limited. Concerning the liquid properties of the finally obtained colored particle dispersion, usually, it is preferable that the pH of the colored particle dispersion is from 4.5 to 10. The value of pH may also be determined according to the desired degree of neutralization of the resin dispersant.

The colorant, resin dispersant, and other additives used in the method for producing the colored particle dispersion each have the same definitions as those described above in the section of colored particle, respectively, and so are the preferable examples.

Preferable examples of the organic solvent include alcohol solvents, ketone solvents, and ether solvents. Specific examples of the alcohol solvents include ethanol, isopropanol, n-butanol, t-butanol, isobutanol, and diacetone alcohol. Specific examples of the ketone solvents include acetone, methyl ethyl ketone, diethyl ketone, and methyl isobutyl ketone. Specific examples of the ether solvents include dibutyl ether, tetrahydrofuran, and dioxane. Among these solvents, isopropanol, acetone, and methyl ethyl ketone are preferable, and methyl ethyl ketone is particularly preferable. The organic solvents may be used alone or plural organic solvents may be used in combination.

In producing the colored particle dispersion, kneading and dispersion treatment may be carried out while applying strong shear force by using a twin roll, a triple roll, a ball mill, a thoron mill, a Disper, a kneader, a co-kneader, a homogenizer, a blender, a single-screw extruder, a twin-screw extruder, or the like. Details on kneading and dispersion are described in, for example, "Paint Flow and Pigment Dispersion" written by T. C. Patton (published by John Wily and Sons, Inc., 1964).

Further, as necessary, in producing the colored particle dispersion, fine dispersion treatment with beads which have a particle diameter of from 0.01 mm to 1 mm and are made of glass, zirconia, or the like, using a vertical or horizontal sand grinder, a pin mill, a slit mill, an ultrasonic disperser, or the like may be performed.

Concerning the removal of the organic solvent in the method for producing the colored particle dispersion according to the invention, the method of removing the organic solvent is not particularly limited, and the organic solvent can be removed by a known method such as distillation under reduced pressure.

The volume average particle diameter of the colored particles in the invention is preferably 10 nm or more but less than 200 nm, more preferably 50 nm or more but less than 130 nm, and even more preferably 60 nm or more but less than 100 nm. When the volume average particle diameter is within the above range, color forming property, dispersion stability, and ejection stability in an ink-jet method may become good. The volume average particle diameter of the colored particles is a value measured by a dynamic scattering method.

[Aqueous Medium]

The ink composition of the present invention preferably contains an aqueous medium. The aqueous medium includes at least water, and may further include at least one water-soluble organic solvent, as necessary. Water-soluble organic solvents can be used as an anti-drying agent, a wetting agent, or a permeation accelerator. Specifically, when a water-soluble organic solvent is used as an anti-drying agent, for example, clogging of nozzle, which may possibly be caused by drying of an ink, in which a dispersion including a colorant is used, at an ink ejection orifice can be prevented. When a water-soluble organic solvent is used as an anti-drying agent or a wetting agent, a water-soluble organic solvent having a vapor pressure lower than that of water is preferably used. Further, when a water-soluble organic solvent is used as a permeation accelerator, the ink ejected by an ink-jet method can well penetrate into paper.

Examples of the water-soluble organic solvent include alkanediols (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; alkyl alcohols having from 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone, N-methyl-2-pyrrolidone, 1,3-dimethyl-2-imidazolidinone, formamide, acetamide, dimethylsulfoxide, sorbit, sorbitan, acetin, diacetin, triacetin, and sulfolane. These water-soluble organic solvents may be used alone or in a combination of two or more of them.

For the purpose of functioning as an anti-drying agent or a wetting agent, polyhydric alcohols are useful. Examples thereof include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, and 1,2,6-hexanetriol. These polyhydric alcohols may be used alone or in a combination of two or more of them.

For the purpose of functioning as a permeation accelerator, polyol compounds are preferable, and an aliphatic diol is suitably used. Examples of the aliphatic diol include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol, and 2,2,4-trimethyl-1,3-pentanediol. Preferable examples among them include 2-ethyl-1,3-hexanediol and 2,2,4-trimethyl-1,3-pentanediol.

The water-soluble organic solvents may be used alone or may be used as a mixture of two or more of them. The content of the water-soluble organic solvent is preferably from 1% by mass to 60% by mass, and more preferably from 5% by mass to 40% by mass, with respect to the total mass of the ink composition.

The amount of water included in the ink composition is not particularly limited, and the content of water is preferably from 10% by mass to 99% by mass, more preferably from 20% by mass to 95% by mass, and even more preferably from 30% by mass to 90% by mass.

Further, the content of the aqueous medium in the ink composition of the invention is preferably from 1% by mass to 99% by mass, more preferably from 2% by mass to 95% by mass, and particularly preferably from 5% by mass to 90% by mass, from the viewpoints of prevention of drying, penetrability into the material to be adhered, and liquid properties such as viscosity. When the content of the aqueous medium is within the above range, drying speed of the dispersion including a colorant, penetrability into the material to be adhered, and liquid properties such as viscosity may be adjusted to be in proper states.

[Polymerizable Compound]

The ink composition of the invention preferably contains at least one poymerizable compound having an ethylenically unsaturated bond, and more preferably contains at least one water-soluble polymerizable compound (hereinafter, may be referred to as a "specific polymerizable compound") having an ethylenically unsaturated bond.

The specific polymerizable compound is a water-soluble compound having at least one radically polymerizable ethylenically unsaturated bond in the molecule (wherein, the compound may have a chemical form of, for example, a monomer, an oligomer, a polymer, or the like). The specific polymerizable compounds may be used alone in the ink composition, or two or more of them may be used in combination at any ratio for the purpose of improving intended properties. It is preferable to use two or more polymerizable compounds in combination from the viewpoint of controlling performance such as reactivity and physical properties.

The specific polymerizable compound is preferably a compound that dissolves in distilled water under the condition of room temperature at a proportion of 2% by mass or more, more preferably a compound that dissolves in distilled water at 15% by mass or more, and particularly preferably a compound that may be homogeneously mixed with water at any proportion.

Examples of the specific polymerizable compound include esters (monoacrylate, a polyfunctional acrylate monomer, a polyfunctional acrylate oligomer, or the like) and amides of unsaturated carboxylic acid such as acrylic acid, methacrylic acid, itaconic acid, crotonic acid, isocrotonic acid, or maleic acid; anhydrides having an ethylenically unsaturated group; acrylonitrile; styrene; and various unsaturated polyesters, unsaturated polyethers, unsaturated polyamides, unsaturated urethanes, vinyl ethers, and allyl ethers. The specific compound is preferably at least one selected from among esters of acrylic acid or methacrylic acid, and amides of acrylic acid or methacrylic acid.

It is preferable that the specific polymerizable compound has a polyoxyethylene chain, a polyoxypropylene chain, or an ionic group (for example, a carboxy group, a sulfo group, or the like) in order to impart solubility in water. When the specific polymerizable compound has a polyoxyethlene chain or a polyoxypropylene chain, the number of oxyethylene units or oxypropylene units is preferably in a range of from 1 to 10, and more preferably in a range of from 1 to 5. When the length of the chain is within the range described above, hardness of a film after curing, adhesion to a recording medium, and the like can be ensured, while obtaining the solubility in water.

In a preferable embodiment of the specific polymerizable compound, a combination of monoacrylate and a polyfunctional acrylate monomer having a molecular weight of 400 or more, preferably 500 or more, or a polyfunctional acrylate oligomer are used as a radically polymerizable compound, from the viewpoints of further improving the sensitivity, bleeding resistance, and adhesion to a recording medium. Particularly, in the ink composition used for recording on a soft recording medium such as PET (polyethylene terephthalate) film or PP (polypropylene) film, it is preferable to use monoacrylate selected from the above compound group and a polyfunctional acrylate monomer or a polyfunctional acrylate oligomer in combination, from the viewpoints of imparting flexibility, enhancing the adhesion, and at the same time, enhancing the film strength. Further, an embodiment in which at least three polymerizable compounds including a monofunctional monomer, a bifunctional monomer, and a polyfunctional monomer of a tri- or higher-functional monomer are used in combination is preferable, from the viewpoints of maintaining safety and further improving the sensitivity, bleeding resistance, and adhesion to a recording medium.

Specific examples of the specific polymerizable compound, which is particularly preferably used, include compounds having a structure shown below (exemplary compounds 2-1 to 2-4). However, it should be construed that the present invention is not limited to these compounds.

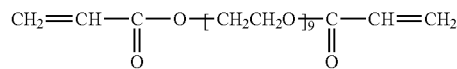
(2-1)

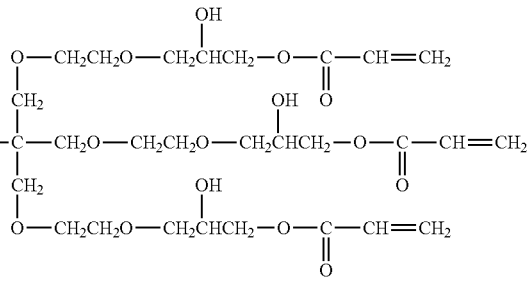
(2-2)

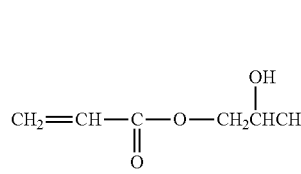

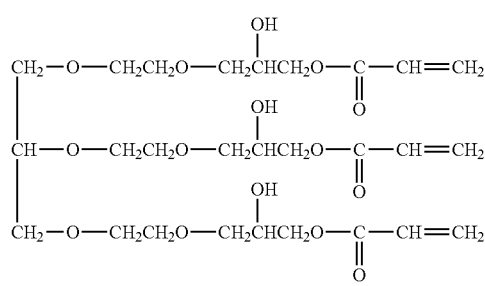
(2-3)

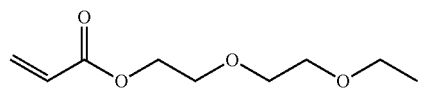
(2-4)

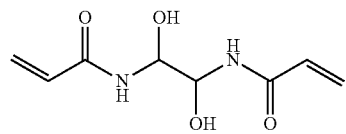
(2-5)

The content of the polymerizable compound having an ethylenically unsaturated bond in the ink composition of the present invention is preferably from 1% to 30%, and more preferably from 5% to 20%, on the basis of mass, with respect to the total mass of the ink composition.

[Polymerization Initiator]

It is preferable that the ink composition of the invention further contains at least one polymerization initiator. The polymerization initiator is not particularly limited as far as it exhibits a good polymerization initiating ability, and may be selected from known polymerization initiators. Among the polymerization initiators, water-soluble polymerization initiators are preferable. Concerning the degree of "solubility in water", the polymerization initiator preferably dissolves in distilled water under the condition of 25° C. at a proportion of 0.5% by mass or more, more preferably 1% by mass or more, and particularly preferably 3% by mass or more.

Among the polymerization initiators, a polymerization initiator selected from the group consisting of α-aminoketone compounds and acylphosphine oxide compounds is preferable.

As the α-aminoketone compound, a compound having a structure represented by the following Formula (5) is preferable.

Formula (5)

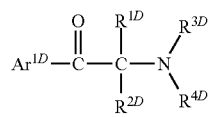
(5)

In Formula (5) above, $Ar^{1D}$ represents a phenyl group substituted by $-SR^{51}$ or $-N(R^{52})(R^{53})$; and $R^{51}$ represents a hydrogen atom or an alkyl group. $R^{52}$ and $R^{53}$ each independently represent a hydrogen atom, an alkyl group having from 1 to 12 carbon atoms, an alkyl group which has from 2 to 4 carbon atoms and is substituted by an alkoxy group having from 1 to 4 carbon atoms, or an alkenyl group having from 3 to 5 carbon atoms. $R^{52}$ and $R^{53}$ may bond to each other to form an alkylene group having from 3 to 7 carbon atoms, and the alkylene group may include $-O-$ or $-N(R^{54})-$ in the alkylene chain. $R^{54}$ represents an alkyl group having from 1 to 4 carbon atoms.

$R^{1D}$ and $R^{2D}$ each independently represent an alkyl group having from 1 to 8 carbon atoms. $R^{1D}$ and $R^{2D}$ may bond to each other to form an alkylene group having from 2 to 9 carbon atoms. $R^{3D}$ and $R^{4D}$ each independently represent a hydrogen atom, an alkyl group having from 1 to 12 carbon atoms, an alkyl group which has from 2 to 4 carbon atoms and is substituted by an alkoxy group having from 1 to 4 carbon atoms, or an alkenyl group having from 3 to 5 carbon atoms. Here, $R^{3D}$ and $R^{4D}$ may bond to each other to form an alkylene group having from 3 to 7 carbon atoms, and the alkylene group may include $-O-$ or $-N(R^{54})-$ in the alkylene chain. $R^{54}$ represents an alkyl group having from 1 to 4 carbon atoms.

Examples of the α-aminoketone compound include 2-methyl-1-phenyl-2-morpholinopropan-1-one, 2-methyl-1-(4-hexylphenyl)-2-morpholinopropan-1-one, 2-ethyl-2-dimethylamino-1-(4-morpholinophenyl)-butan-1-one. Further, there are commercially available products such as IRGACURE series (trade name) manufactured by BASF (former Ciba), for example, IRGACURE 907, IRGACURE 369, and IRGACURE 379 (all trade names), and they are also the α-aminoketone compounds.

As the acylphosphine oxide compound described above, a compound represented by the following Formula (6) or Formula (7) is preferable.

Formula (6)

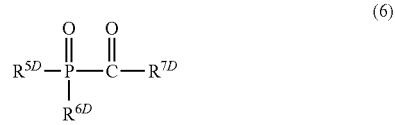

(6)

In Formula (6) above, $R^{5D}$ and $R^{6D}$ each independently represent an aliphatic group, an aromatic group, an aliphatic oxy group, an aromatic oxy group, or a heterocyclic group; and $R^{7D}$ represents an aliphatic group, an aromatic group, or a heterocyclic group.

Examples of the aliphatic group represented by $R^{5D}$, $R^{6D}$, or $R^{7D}$ include an alkyl group, a substituted alkyl group, an alkenyl group, a substituted alkenyl group, an alkynyl group, a substituted alkynyl group, an aralkyl group, and a substituted aralkyl group. Among them, an alkyl group, a substituted alkyl group, an alkenyl group, a substituted alkenyl group, an aralkyl group, and a substituted aralkyl group are preferable, and an alkyl group and a substituted alkyl group are particularly preferable. Further, the aliphatic group may be a cyclic aliphatic group or a chain aliphatic group. The chain aliphatic group may be branched.

The alkyl group may be a straight-chain, branched, or cyclic alkyl group. The alkyl group has preferably from 1 to 30 carbon atoms, and more preferably from 1 to 20 carbon atoms. The number of carbon atoms in the alkyl moiety of the substituted alkyl group is preferably from 1 to 30, and more preferably from 1 to 20. Further, the alkyl group may be either a substituted alkyl group or an unsubstituted alkyl group. Examples of the alkyl group include a methyl group, an ethyl group, a propyl group, a butyl group, a pentyl group, a hexyl group, an octyl group, a 2-ethylhexyl group, a decyl group, a dodecyl group, an octadecyl group, a cyclohexyl group, a cyclopentyl group, a neopentyl group, an isopropyl group, and an isobutyl group.

Examples of a substituent of the substituted alkyl group include a carboxy group, a sulfo group, a cyano group, a halogen atom (for example, a fluorine atom, a chlorine atom, or a bromine atom), a hydroxy group, an alkoxycarbonyl group having 30 or less carbon atoms (for example, a methoxycarbonyl group, an ethoxycarbonyl group, or a benzyloxycarbonyl group), an alkylsulfonylaminocarbonyl group having 30 or less carbon atoms, an arylsulfonylaminocarbonyl group, an alkylsulfonyl group, an arylsulfonyl group, an acylaminosulfonyl group having 30 or less carbon atoms, an alkoxy group having 30 or less carbon atoms (for example, a methoxy group, an ethoxy group, a benzyloxy group, a phenoxyethoxy group, or a phenethyloxy group), an alkylthio group having 30 or less carbon atoms (for example, a methylthio group, an ethylthio group, or a methylthioethylthioethyl group), an aryloxy group having 30 or less carbon atoms (for example, a phenoxy group, a p-tolyloxy group, a 1-naphthoxy group, or a 2-naphthoxy group), a nitro group, an alkyl group having 30 or less carbon atoms, an alkoxycarbonyloxy group, an aryloxycarbonyloxy group, an acyloxy group having 30 or less carbon atoms (for example, an acetyloxy group or a propionyloxy group), an acyl group having 30 or less carbon atoms (for example, an acetyl group, a propionyl group, or a benzoyl group), a carbamoyl group (for example, a carbamoyl group, an N,N-dimethylcarbamoyl group, a morpholinocarbonyl group, or a piperidinocarbonyl group), a sulfamoyl group (for example, a sulfamoyl group, an N,N-dimethylsulfamoyl group, a morpholinosulfonyl group, or a piperidinosulfonyl group), an aryl group having 30 or less carbon atoms (for example, a phenyl group, a 4-chlorophenyl group, a 4-methylphenyl group, or an α-naphthyl group), an amino group, a substituted amino group (for example, an alkylamino group, a dialkylamino group, an arylamino group, a diarylamino group, or an acylamino group), a substituted ureido group, a substituted phosphono group, and a heterocyclic group. Herein, the carboxy group, the sulfo group, the hydroxy group, and the phosphono group may be in the state of a salt. In this case, examples of a cation that may be used for forming the salt include inorganic cations, examples thereof including a lithium ion, a sodium ion and a potassium ion; and organic cations, examples thereof including a quaternary ammonium cation.

The alkenyl group may be a straight-chain, branched, or cyclic alkenyl group. The alkenyl group has preferably from 2 to 30 carbon atoms, and more preferably from 2 to 20 carbon atoms. Further, the alkenyl group may be either a substituted alkenyl group or an unsubstituted alkenyl group. The number of carbon atoms in the alkenyl moiety of the substituted alkenyl group is preferably from 2 to 30, and more preferably from 2 to 20. Examples of a substituent of the substituted alkenyl group include those described as examples of the substituents of the substituted alkyl group described above.

The alkynyl group may be a straight-chain, branched, or cyclic alkynyl group. The alkynyl group has preferably from 2 to 30 carbon atoms, and more preferably from 2 to 20 carbon atoms. Further, the alkynyl group may be either a substituted alkynyl group or an unsubstituted alkynyl group. The number of carbon atoms in the alkynyl moiety of the substituted alkynyl group is preferably from 2 to 30, and more preferably from 2 to 20. Examples of a substituent of the substituted alkynyl group include those described as examples of the substituent of the substituted alkyl group described above.

The aralkyl group may be a straight-chain, branched, or cyclic aralkyl group. The aralkyl group has preferably from 7 to 35 carbon atoms, and more preferably from 7 to 25 carbon atoms. Further, the aralkyl group may be either a substituted aralkyl group or an unsubstituted aralkyl group. The number of carbon atoms in the aralkyl moiety of the substituted aralkyl group is preferably from 7 to 35, and more preferably from 7 to 25. Examples of a substituent of the substituted aralkyl group include those described as examples of the substituents of the substituted alkyl group described above.

Examples of the aromatic group represented by $R^{5D}$, $R^{6D}$, or $R^{7D}$ above include an aryl group and a substituted aryl group. The aryl group has preferably from 6 to 30 carbon atoms, and more preferably from 6 to 20 carbon atoms. The number of carbon atoms in the aryl moiety of the substituted aryl group is preferably from 6 to 30, and more preferably from 6 to 20. Examples of the aryl group include a phenyl group, an α-naphthyl group, and a β-naphthyl group. Examples of a substituent of the substituted aryl group include those described as examples of the substituent of the substituted alkyl group described above.

The aliphatic oxy group represented by $R^{5D}$ or $R^{6D}$ above is preferably an alkoxy group having from 1 to 30 carbon atoms. Specific examples thereof include a methoxy group, an ethoxy group, a butoxy group, an octyloxy group, and a phenoxyethoxy group. However, the invention is not limited to these examples.

The aromatic oxy group represented by $R^{5D}$ or $R^{6D}$ above is preferably an aryloxy group having from 6 to 30 carbon atoms. Specific examples thereof include a phenoxy group, a methylphenyloxy group, a chlorophenyloxy group, a methoxyphenyloxy group, and an octyloxyphenyloxy group. However, the invention is not limited to these examples.

The heterocyclic group represented by $R^{5D}$, $R^{6D}$, or $R^{7D}$ above is preferably a heterocyclic group containing a nitrogen atom, an oxygen atom, or a sulfur atom. Specific examples thereof include a pyridyl group, a furyl group, a thienyl group, an imidazolyl group, and a pyrrolyl group.

Formula (7)

$$R^{8D}-\overset{O}{\underset{}{C}}-\overset{O}{\underset{R^{9D}}{P}}-\overset{O}{\underset{}{C}}-R^{10D} \quad (7)$$

In Formula (7) above, $R^{8D}$ and $R^{10D}$ each independently represent an alkyl group, an aryl group, or a heterocyclic group; and $R^{9D}$ represents an alkyl group, an aryl group, an alkoxy group, an aryloxy group, or a heterocyclic group. The alkyl group, aryl group, heterocyclic group, alkoxy group, and aryloxy group represented by $R^{8D}$, $R^{9D}$, and $R^{10D}$ each may be unsubstituted or may have a substituent. Examples of the substituent, in the case of having a substituent, include those described as examples of the substituents in Formula (6) described above.

The alkyl group, aryl group, heterocyclic group, alkoxy group, and aryloxy group in Formula (7) each have the same definitions as those in the above Formula (6), respectively.

Among the acylphosphine oxide compounds described above, for example, [2,4,6-trimethylbenzoyl-diphenyl-phosphine oxide] is commercially available under the trade name of DAROCUR TPO (manufactured by BASF), and [bis(2,4,6-trimethylbenzoyl)-phenylphosphine oxide] is commercially available under the trade name of IRGACURE 819 (manufactured by BASF).

Further, water-soluble acylphosphine oxide compounds may be preferably used as the polymerization initiators. The acylphosphine oxide compounds preferably dissolve in distilled water under the condition of 25° C. at a proportion of 0.5% by mass or more, more preferably 1% by mass or more, and particularly preferably 3% by mass or more.

Specific examples of the water-soluble acylphosphine oxide compounds include the compounds described in JP-A No. 2005-307199 (for example, the exemplary compounds 5, 6, and 7). Specific examples of the water-soluble acylphosphine oxide compounds (exemplary compounds 1-1 to 1-3) are shown below. However, it should be construed that the invention is not limited thereto.

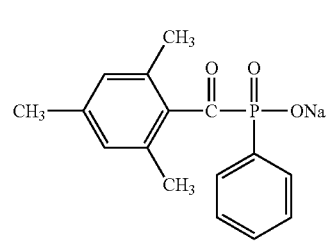
(1-1)

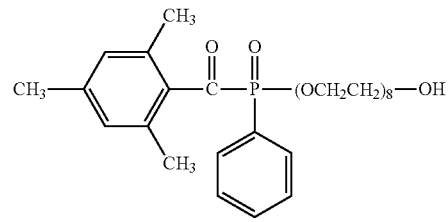
(1-2)

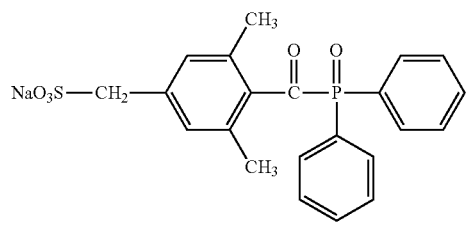
(1-3)

Among the compounds described above, it is preferable to use an acylphosphine oxide compound as a polymerization initiator.

A polymerization initiator other than the above-described polymerization initiators may be also used within a range that does not decrease the effect of the present invention. Further, a polymerization initiator other than the above-described polymerizatior initiator may be used in combination with the acylphosphine oxide compound. In this case, a water-soluble polymerization initiator is preferably used as the polymerization initiator used in combination with the acylphosphine oxide compound. With respect to the degree of "water-solublility", the polymerization initiator is preferably dissolve in distilled water under the condition of 25° C. at a proportion of 0.5% by mass or more, more preferably 1% by mass or more, and particularly preferably 3% by mass or more, as described above.

Examples of the other polymerization initiator described above, which can be used, include camphorquinone, benzophenone, benzophenone derivatives, acetophenone, acetophenone derivatives, for example, α-hydroxycycloalkyl phenyl ketones, 2-hydroxy-2-methyl-1-phenyl-propanone, and dialkoxyacetophenones, α-hydroxy- or 4-aroyl-1,3-dioxolanes, benzoin alkyl ethers, benzyl ketals, for example, benzyl dimethyl ketal, phenyl glyoxalate and derivatives thereof, dimer phenyl glyoxalate, peresters, for example, benzophenonetetracarboxylic acid peresters (for example, those described in EP No. 1,126,541), halomethyltriazines, for example, 2-[2-(4-methoxyphenyl)vinyl]-4,6-bis-trichloromethyl[1,3,5]triazine, 2-(4-methoxyphenyl)-4,6-bis-trichloromethyl[1,3,5]triazine, 2-(3,4-dimethoxyphenyl)-4,6-bis-trichloromethyl[1,3,5]triazine, and 2-methyl-4,6-bis-trichloromethyl[1,3,5]triazine, a hexaarylbisimidazole/co-initiator system, for example, a combination of ortho-chlorohexaphenyl-bisimidazole and 2-mercaptobenzothiazole; ferrocenium compounds or titanocenes, for example, dicyclopentadienyl-bis(2,6-difluoro-3-pyrrolo-phenyl)titanium; and, for example, a mixture with an O-acyloxime ester compound described in GB No. 2,339,571. As the co-initiator, a boric aid compound may be used.

The content of the polymerization initiator in the ink composition is preferably in a range of from 0.01 parts by mass to 35 parts by mass, more preferably from 0.1 parts by mass to 30 parts by mass, and even more preferably from 0.5 parts by mass to 30 parts by mass, with respect to 100 parts by mass of the polymerizable compound described above. Note that, the content of the polymerization initiator means the total amount of used polymerization initiator(s).

[Resin Particles]

The ink composition of the present invention may contain at least one type of resin particles. When resin particles are incorporated, image fixability and scratch resistance may be improved.

Examples of the resin particles includes particles of an acrylic resin, a vinyl acetate resin, a styrene-butadiene resin, a vinyl chloride resin, an acryl-styrene resin, a butadiene resin, a styrene resin, a crosslinked acrylic resin, a crosslinked styrene resin, a benzoguanamine resin, a phenol resin, a silicone resin, an epoxy resin, a urethane resin, a paraffin resin, a fluororesin, or the like. The resin particles may be included in the ink composition by using for example, the latex of these, and the like. Among them, preferable examples of the resin particles may include particles of an acrylic resin, an acryl-styrene resin, a styrene resin, a crosslinked acrylic resin, or a crosslinked styrene resin.

The resin of the resin particles preferably has a weight average molecular weight of from 10,000 to 200,000, and more preferably from 100,000 to 200,000. The average particle diameter of the resin particles is preferably in a range of from 10 nm to 1 μm, more preferably in a range of from 10 nm to 200 nm, even more preferably in a range of from 20 nm to 100 nm, and particularly preferably in a range of from 20 nm to 50 nm, in terms of volume average particle diameter.

There is no particular limitation concerning particle diameter distribution of the resin particles, and the particles may exhibit a wide particle diameter distribution or may exhibit a monodispersed particle diameter distribution. Further, a mixture of two or more types of resin particles each having a monodispersed particle diameter distribution may also be used.

The glass transition temperature (Tg) of the resin particles is preferably 30° C. or higher, more preferably 40° C. or higher, and even more preferably 50° C. or higher.

The content of the resin particles in the ink composition is preferably 20% by mass or less, and more preferably 15% by mass or less, with respect to the total mass of the ink composition.

[Other Additives]

The ink composition of the invention may include additives other than as described above, as necessary. Examples of the other additives include known additives such as an ultraviolet absorber, a color fading inhibitor, a mildew proofing agent, a pH adjusting agent, an anti-rust agent, an antioxidant, an emulsification stabilizer, an antiseptic, an antifoaming agent, a viscosity adjusting agent, a dispersion stabilizer, a chelating agent, a surface tension adjusting agent, and a solid wetting agent.

Examples of the color fading inhibitor that can be used include various organic color fading inhibitors and metal complex color fading inhibitors. Examples of the organic color fading inhibitors include hydroquinones, alkoxyphenols, dialkoxyphenols, phenols, anilines, amines, indanes, chromanes, alkoxyanilines, and heterocycles. Examples of the metal complex color fading inhibitors include nickel complexes and zinc complexes. Further, examples of the antioxidant include a phenol antioxidant (including a hindered phenol antioxidant), an amine antioxidant, a sulfur antioxidant, and a phosphorus antioxidant. Examples of the surface tension adjusting agent include a nonionic surfactant, a cationic surfactant, an anionic surfactant, and a betaine surfactant. In order to eject the ink composition satisfactorily by means of an ink-jet system, the addition amount of the surface tension adjusting agent is preferably an addition amount that adjusts the surface tension of the ink composition to the range of 20 mN/m to 60 mN/m, more preferably an addition amount that adjusts the surface tension of the ink composition to the range of 20 mN/m to 45 mN/m, and even more preferably an addition amount that adjusts the surface tension of the ink composition to the range of 25 mN/m to 40 mN/m.

Specific examples of the other additives include those described in paragraphs [0153] to [0162] of JP-A No. 2007-100071.

Examples of the solid wetting agent may include sugars such as glucose, mannose, fructose, ribose, xylose, arabinose, galactose, aldonic acid, glucitol, maltose, cellobiose, lactose, sucrose, trehalose, and maltotriose; sugar alcohols; hyaluronic acids; and ureas.

The additives may be added directly after the preparation of the ink composition, or may be added during the preparation of the ink composition.

As the surface tension adjusting agent, a surfactant having a structure including both of a hydrophilic moiety and a hydrophobic moiety in the molecule is preferable, and an anionic surfactant, a cationic surfactant, an amphoteric surfactant, or a nonionic surfactant can be used. Further, a polymer substance (a polymer dispersant) may be used as a surfactant.

Specific examples of the anionic surfactant include sodium dodecylbenzenesulfonate, sodium lauryl sulfate, alkyl diphenyl ether disulfuric acid sodium salt, sodium alkyl naphthalene sulfonate, sodium dialkyl sulfosuccinate, sodium stearate, potassium oleate, sodium dioctyl sulfosuccinate, polyoxyethylene alkyl ether sulfuric acid sodium salt, polyoxyethylene alkyl phenyl ether sulfuric acid sodium salt, sodium dialkyl sulfosuccinate, sodium stearate, sodium oleate, and t-octylphenoxyethoxy polyethoxyethyl sulfuric acid sodium salt.

Specific examples of the nonionic surfactant include polyoxyethylene lauryl ether, polyoxyethylene octyl phenyl ether, polyoxyethylene oleyl phenyl ether, polyoxyethylene nonyl phenyl ether, oxyethylene-oxypropylene block copolymer, t-octylphenoxyethyl polyethoxyethanol, nonylphenoxyethyl polyethoxyethanol, and acetylene glycol type surfactants (for example, SURFYNOLS (trade name, manufactured by Air Products & Chemicals) and OLFINE (trade name, manufactured by Nissin Chemical Industry Co., Ltd.)).

Further, specific examples of the cationic surfactant include tetraalkyl ammonium salts, alkylamine salts, benzalkonium salts, alkylpyridium salts, and imidazolium salts. More specifically, dihydroxyethylstearylamine, 2-heptadecenyl-hydroxyethylimidazoline, lauryldimethylbenzylammonium chloride, cetylpyridinium chloride, and stearamidomethylpyridium chloride are described.

The surfactants may be used alone or in a combination of two or more of them. The content of the surfactant in the ink composition is not particularly limited, and is preferably 1% by mass or more, more preferably from 1% by mass to 10% by mass, and even more preferably from 1% by mass to 3% by mass.

When supply of ink is carried out by means of an ink-jet system, the viscosity of the ink composition is preferably in a range of from 1 mPa·s to 30 mPa·s, more preferably in a range of from 1 mPa·s to 20 mPa·s, even more preferably in a range of from 2.5 mPa·s to 15 mPa·s, and particularly preferably in a range of from 2 mPa·s to 10 mPa·s, from the viewpoints of droplet ejection stability and rate of aggregation. The viscosity of the ink composition can be measured using, for example, an E type viscometer at 20° C.

The pH of the ink composition is preferably from 7 to 10, and more preferably from 7 to 9, from the viewpoints of stability of the ink and rate of aggregation. When the pH is within this range, storage stability may be enhanced, and corrosion of a member of a device in which the ink composition is applied (ink-jet recording device) may be suppressed. Note that, the pH of the ink composition is measured at 25° C. using a generally used pH meter (for example, PH METER D-50 (trade name), manufactured by Horiba Ltd.).

Further, the pH of the ink composition can be properly adjusted using an acidic compound or a basic compound. As the acidic compound or basic compound, a compound which is generally used as an acidic compound or basic compound can be used without any particular limitation.

<Ink Set>

The ink set of the present invention is configured to include the above-described ink composition of the present invention and a treatment liquid including an aggregating component that aggregates components included in the ink composition. By using the ink set including the ink composition of the present invention described above, an image with less bleeding and high glossiness can be formed and, in the case of applying the ink set to an ink-jet method, ejection stability may be excellent and recoverability may be excellent.

Details concerning the ink composition are as described above. In the following, the treatment liquid is described in detail.

The treatment liquid in the invention is an aqueous composition which can form an aggregate when the treatment liquid is in contact with the ink composition. Specifically, the treatment liquid includes at least an aggregating component which can aggregate dispersed particles such as colored particles (a pigment or the like) in the ink composition to form an aggregate, when mixed with the ink composition. The treatment liquid may further include other components, if necessary. By using the treatment liquid together with the ink composition, ink-jet recording may be speeded up and, even when a high-speed recording is performed, an image having high density and high definition may be obtained.

—Treatment Liquid—

The treatment liquid contains at least one aggregating component (hereinafter, also referred to as an "aggregating agent") which can form an aggregate when the treatment liquid is in contact with the ink composition. When the treatment liquid is mixed with the ink composition that is supplied onto a recording medium, aggregation of a pigment or the like, which has been stably dispersed in the ink composition, is promoted.

Examples of the aggregating agent may include compounds which can change the pH of the ink composition, polyvalent metal salts, and cationic compounds. In the present invention, from the viewpoint of aggregation property of the ink composition, a compound that can change the pH of the ink composition is preferable, and a compound that can reduce the pH of the ink composition is more preferable.

As the compound that can reduce the pH of the ink composition, an acidic compound is described.

Preferable examples of the acidic compound include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidonecarboxylic acid, pyronecarboxylic acid, pyrrolecarboxylic acid, furancarboxylic acid, pyridinecarboxylic acid, coumarinic acid, thiophenecarboxylic acid, nicotinic acid, derivatives of these compounds, and salts thereof.

Above all, an acidic compound having high solubility in water is preferable. Further, from the viewpoint of fixing the whole ink by reacting with the ink composition, an acidic compound having a valency of three or less is preferable, and an acidic compound having a valency of two or three is particularly preferable.

The acidic compounds may be used alone, or may be used in a combination of two or more of them.

When the treatment liquid in the invention contains an acidic compound, the pH (at 25° C.) of the treatment liquid is preferably from 0.1 to 6.0, more preferably from 0.5 to 5.0, and even more preferably from 0.8 to 4.0.

Examples of the polyvalent metal salt may include salts of an alkaline earth metal belonging to Group 2 of the periodic table (for example, magnesium or calcium), salts of a transition metal belonging to Group 3 of the periodic table (for example, lanthanum), salts of a cation of an element belonging to Group 13 of the periodic table (for example, aluminum), salts of lanthanides (for example, neodymium). As the salts of these metals, carboxylic acid salts (for example, salts of formic acid, salts of acetic acid, and salts of benzoic acid), nitric acid salts, chlorides, and thiocyanic acid salts are preferable. Above all, calcium salts or magnesium salts of carboxylic acid (for example, salts of formic acid, salts of acetic acid, and salts of benzoic acid), calcium salts or magnesium salts of nitric acid, calcium chloride, magnesium chloride, and calcium salts or magnesium salts of thiocyanic acid are more preferable.

As the cationic compound, a cationic surfactant may be preferably used. As the cationic surfactant, for example, a primary, secondary, or tertiary amine salt type compound is preferable. Examples of the amine salt type compound may include compounds of hydrochlorides, acetates, or the like (for example, hydrochlorides or acetates of laurylamine, coconut amine, stearylamine, or rosin amine), quaternary ammonium salt type compounds (for example, lauryltrimethylammonium chloride, cetyltrimethylammonium chloride, lauryldimethylbenzylammonium chloride, benzyltributylammonium chloride, and benzalkonium chloride), pyridinium salt type compounds (for example, cetylpyridinium chloride and cetylpyridinium bromide), imidazoline type cationic compounds (for example, 2-heptadecenyl-hydroxyethylimidazoline), and ethylene oxide adducts of higher alkylamine (for example, dihydroxyethylstearylamine). Further, polyallylamines may be used. Other than these compounds, amphoteric surfactants which exhibit a cationic property in the desired pH region can be used. Examples of such amphoteric surfactant include amphoteric surfactants of an amino acid type, compounds of an R—NH—CH$_2$CH$_2$—COOH type (wherein R represents an alkyl group, or the like), carboxylic acid salt type amphoteric surfactants (for example, stearyldimethylbetaine or lauryldihydroxyethylbetaine), amphoteric surfactants of a sulfuric acid ester type, sulfonic acid type, or phosphoric acid ester type, and the like.

The aggregating agents may be used alone or as a mixture of two or more of them.

The content of the aggregating agent in the treatment liquid is preferably from 1% by mass to 50% by mass, more preferably from 3% by mass to 45% by mass, and even more preferably from 5% by mass to 40% by mass.

When at least one of the acidic compound or the cationic compound is used in combination with the polyvalent metal compound, the content of the acidic compound or the cationic compound in the treatment liquid (the total content of the acidic compound and the cationic compound) is preferably from 5% by mass to 95% by mass, and more preferably from 20% by mass to 80% by mass, with respect to the total content of the polyvalent metal compound.

The treatment liquid in the invention may generally include, in addition to the aggregating agent, a water-soluble organic solvent, and may further include other additives. Details on the water-soluble organic solvent and the other additives are substantially similar to those in the ink composition described above.

The surface tension (at 25° C.) of the treatment liquid is preferably from 20 mN/m to 60 mN/m, more preferably from 25 mN/m to 50 mN/m, and even more preferably from 25 mN/m to 45 mN/m. The surface tension is measured using Automatic Surface Tensiometer CBV P-Z (trade name, manufactured by Kyowa Interface Science Co., Ltd.) under the condition where the temperature of the treatment liquid is 25° C.

As the method for supplying the treatment liquid onto coated paper, a known method for supplying liquid may be used without any particular limitation. Any method can be selected from among spray coating, coating using a coating roller or the like, application in accordance with an ink-jet system, dipping, and the like.

The treatment liquid may be supplied in a whole surface supply in which the treatment liquid is supplied on the whole surface of a recording medium (coated paper), or may be supplied in a partial supply in which the treatment liquid is partially supplied onto a region where ink-jet recording is performed in the succeeding ink supplying process. In the present invention, a whole surface supply, in which the treatment liquid is supplied on the whole surface of coated paper, by means of coating using a coating roller or the like is preferable, from the viewpoints of adjusting the supply amount of the treatment liquid to be uniform, uniformly recording a fine line, a fine image area, or the like, and suppressing density unevenness such as image unevenness. Examples of a method of coating while adjusting the supply amount of the aggregating agent to the above-described range include a method using an anilox roller. The anilox roller is a roller having a structure in which a form of a pyramid, oblique lines, a shell of a turtle, or the like is provided on an outer circumferential surface thereof through finishing the roller surface, which has been coated with a melt-sprayed ceramic, by using a laser. The treatment liquid flows into the concave portions that are provided on the roller surface, and the treatment liquid is transferred when contacted with a paper surface, so that the treatment liquid is coated at a coating amount controlled by the concavities of the anilox roller.

<Image Forming Method>

The image forming method of the present invention includes supplying the ink composition of the present invention onto a recording medium (ink supplying process) and, as necessary, supplying the treatment liquid (treatment liquid supplying process), irradiating with actinic radiation (actinic radiation irradiating process), and the like.

(Ink Supplying Process)

The ink supplying process is a process of supplying the above-described ink composition of the invention onto a recording medium to form an image. There is no particular limitation concerning the method for forming an image by supplying the ink composition of the invention onto a recording medium, and a known image forming method may be used. For example, methods of supplying an aqueous ink composition onto a recording medium by means of an ink-jet system, a stencil duplication system, a transfer imprinting system, or the like may be described. Among them, from the viewpoints of reducing the size of the recording device and high-speed recording property, an image forming method including a process of supplying the aqueous ink composition of the present invention by means of an ink-jet system is preferable.

—Ink-Jet System—

Image recording utilizing the ink-jet system can be performed, specifically, by supplying energy, thereby ejecting a liquid composition to a desired recording medium, that is, plain paper, resin-coated paper, paper exclusively used for ink-jet recording, which is described in, for example, JP-A Nos. 8-169172, 8-27693, 2-276670, 7-276789, 9-323475, 62-238783, 10-153989, 10-217473, 10-235995, 10-337947, and 10-217597, a film, electrophotographic common paper, fabrics, glass, metal, ceramics, or the like. As the ink-jet system preferable for the present invention, a method described in paragraphs 0093 to 0105 of JP-A No. 2003-306623 can be applied.

The ink-jet system is not particularly limited, and may be a known system. Examples thereof include a charge control system in which an ink is ejected by using an electrostatic attraction force; a drop-on-demand system (pressure pulse system) in which a vibration pressure of a piezo element is used; an acoustic ink-jet system in which an electric signal is converted into an acoustic beam and an ink is irradiated with the acoustic beam so as to be ejected by using the radiation pressure; and a thermal ink-jet (BUBBLE JET (registered trademark)) system in which an ink is heated to form bubbles and the resulting pressure is used.

Ink nozzles and the like, which are used for recording by the ink-jet system, are not particularly limited and may be appropriately selected according to the purposes.

It should be noted that the above ink-jet method include, in its scope, a system of discharging a number of droplets of an ink having low concentration, which is referred to as photo ink, each at a small volume; a system of improving the image quality by using plural inks which have substantially the same hue but different concentrations; and a system of using colorless and transparent ink.

Examples of the ink-jet system include a shuttle system in which a short serial head is used and recording is performed while allowing the serial head to scan in the cross direction of the recording medium, and a line system using a line head in which recording elements are arranged corresponding to the whole region for one side of a recording medium. In the line system, an image can be recorded over the whole surface of the recording medium by allowing the recording medium to scan in the direction being at right angles to the arranging direction of the recording elements, in which a transportation system such as a carriage by which the short head moves for scanning is not necessary. Further, in the line system, since complicated scanning control for the movement of the carriage and the recording medium is not necessary and only the recording medium moves, a higher recording speed can be realized as compared with the shuttle system.

Further, in the ink supplying process, for example, an image can be recorded while changing the transportation speed of the recording medium. The transportation speed is not particularly limited as far as it does not damage the image quality, and is preferably from 100 mm/s to 3,000 mm/s, more preferably from 150 mm/s to 2,700 mm/s, and even more preferably from 250 mm/s to 2,500 mm/s.

There is no particular limitation on the recording medium and, for example, coated paper used for general offset printing and the like may be used. Coated paper may be prepared by coating a coating material on a surface of wood free paper, neutral paper, or the like, which includes mainly cellulose and is not generally subjected to a surface treatment, to provide a coat layer. In general, in the case of image formation by jetting a general aqueous ink and using coated paper as a recording medium, problems concerning qualities such as image bleeding or deterioration in scratch resistance may be easily caused. However, in the image forming method according to the present invention, image bleeding may be suppressed, uniform quality may be provided, occurrence of density unevenness may be suppressed, and an image having good blocking resistance, good durability for offset printing, and good scratch resistance may be recorded.

As for the coated paper, commercially available coated paper may be used. For example, coated paper for general printing may be used, and specifically, "OK TOPCOAT+" (trade name, manufactured by Oji Paper Co., LTD.); COAT PAPER (A2, B2) such as "AURORA COAT" and "U-LITE" (all trade names, manufactured by Nippon Paper Industries Co., Ltd.); ART PAPER (A1) such as "TOKUBISHI ART" (trade name, manufactured by Mitsubishi Paper Mills, Ltd.), and the like may be described.

(Treatment Liquid Supplying Process)

In the treatment liquid supplying process, the above-described treatment liquid containing the aggregating agent that aggregates the component of the ink composition is supplied onto a recording medium (preferably, coated paper). When an image is formed using the ink composition in the presence of the treatment liquid, an image having good blocking resistance, good durability for offset printing, and good scratch resistance may be recorded, and effects of suppressing curl or cockle after recording, and suppressing the occurrence of ink cissing may be also obtained.

The treatment liquid supplying process may be provided before the ink supplying process, or the ink supplying process may be provided before the treatment liquid supplying process. From the viewpoint of forming an image with higher quality, an embodiment in which the ink supplying process is provided after the treatment liquid is supplied onto the recording medium by the treatment liquid supplying process is preferable.

(Process of Irradiating with Actinic Radiation)

It is preferable that the image forming method of the present invention includes a process of irradiating the ink composition supplied on the recording medium with actinic radiation. When the ink composition is irradiated with actinic radiation, the resin dispersant containing a radically polymerizable group and the polymerizable compound in the ink composition are allowed to undergo polymerization and thus, a cured film including a colorant is formed.

The actinic radiation used in the invention is not particularly limited as far as the actinic radiation can cause polymerization of the polymerizable compound. Examples thereof include ultraviolet rays and electron beams. Among them, ultraviolet rays are preferable from the viewpoint of versatility.

—Ultraviolet Irradiation Lamp—

As a means for irradiating with ultraviolet rays, a means which is usually used may be used, and particularly, an ultraviolet irradiation lamp is preferably used.

The ultraviolet irradiation lamp is preferably such a mercury lamp that has a mercury vapor pressure of from 1 Pa to 10 Pa while the lamp is lit, a so-called, a low pressure mercury lamp, a high pressure mercury lamp, a mercury lamp on which a fluorescent substance is coated, or the like. The emission spectrum in the ultraviolet region of these mercury lamps is 450 nm or less, and is particularly in a range of from 184 nm to 450 nm, which is suitable for efficiently allowing the polymerizable compound in the black or colored aqueous ink composition to react. Further, in view of providing a power supply box in a printer, since a small size power supply box can be used, the above mercury lamps are preferable. Concerning the mercury lamp, for example, a metal halide lamp, a high pressure mercury lamp, a super-high pressure mercury lamp, a xenon flash lamp, a deep UV lamp, a lamp in which a mercury lamp is exited using a microwave from the outside without using an electrode, and a UV laser are practically used. Since the region of emission spectrum of these lamps includes the above range, these lamps can be fundamentally applied as far as the size of power supply box, input intensity, shape of lamp, and the like are acceptable. A light source is selected in accordance with the sensitivity of the polymerization initiator used.

It is preferable that the needed ultraviolet ray intensity is from 500 mW/cm$^2$ to 5,000 mW/cm$^2$ in the wavelength region effective for curing. When the irradiation intensity is weak, formation of an image having high quality and durability may not be attained. When the irradiation intensity is too strong, there are cases where the recording medium is damaged, or color fading of a color material occurs.

EXAMPLES

Hereinafter, the present invention is specifically described with reference to Examples, but the scope of the present invention is not limited to these Examples. Unless stated otherwise, the "parts" and "%" are based on mass.

Synthesis Example 1

—Synthesis of Resin Dispersant (P-1)—

An MEK (methyl ethyl ketone) solution (100 g) containing styrene (40 g), monomer M-113 having the structure shown below (30 g), methacrylic acid (15 g), methyl methacrylate (15 g), and 2,2'-azobis(2-methylbutyronitrile) (manufactured by Wako Pure Chemical Industries, Ltd.) (3.0 g) were added dropwise into MEK (100 g) over a period of 3 hours at 75° C., while stirring in a nitrogen atmosphere. After completion of the addition, the mixture was stirred for an additional 3 hours at 75° C. Then, after cooling, the resulting solution was poured into water (20 L) which was being vigorously stirred, and the mixture was stirred for one hour. The precipitated white solid was filtered and dried, thereby obtaining a resin dispersant precursor.

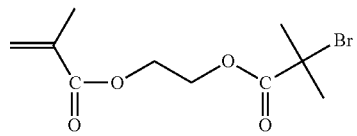

(M-113)

Subsequently, the obtained resin dispersant precursor (85 g), 4-hydroxy-2,2,6,6-tetramethylpyperidinyl-1-oxy free radical (0.6 g), and t-butanol (30 g) were dissolved in MEK (300 g). To the resulting solution, 1,8-diazabicyclo[5.4.0]-7-undecene (100 g) was added dropwise over a period of 2 hours at 0° C., and then the mixture was stirred for 24 hours at room temperature. Thereafter, the resulting solution was adjusted to be acidic using hydrochloric acid at 0° C., and was stirred for 30 minutes at 0° C. Then, the resulting solution was poured into water (20 L) which was being vigorously stirred, and the mixture was stirred for one hour. The precipitated white solid was filtered and dried, to obtain resin dispersant (P-1). The weight average molecular weight of this polymer obtained by measurement by a gel permeation chromatography method was 56,000 in terms of polystyrene.

Further, identification of the obtained resin dispersant was performed by use of NMR and IR spectra.

Polymers of resin dispersants (P-2) to (P-7), and (P-15) to (P-17) were each synthesized in a manner substantially similar to that in the synthesis of resin dispersant (P-1) described above, except that the composition of monomer used in the synthesis of resin dispersant (P-1) was properly changed. It should be noted that the molecular weight was adjusted by adjusting the addition amount of 2,2'-azobis(2-methylbutyronitrile), which is the polymerization initiator.

Synthesis Example 2

—Synthesis of Resin Dispersant (P-8)—

An MEK solution (100 g) containing phenoxyethyl methacrylate (40 g), allyl methacrylate (30 g), methacrylic acid (15 g), methyl methacrylate (15 g), and 2,2'-azobis(2-methylbutyronitrile) (manufactured by Wako Pure Chemical Industries, Ltd.) (3.0 g) were added dropwise into MEK (100 g) over a period of 3 hours at 75° C., while stirring in a nitrogen atmosphere. After completion of the addition, the mixture was stirred for an additional 3 hours at 75° C. Then, after cooling, the resulting solution was poured into water (20 L) which was being vigorously stirred, and the mixture was stirred for one hour. The precipitated white solid was filtered and dried, to obtain resin dispersant (P-8). The weight average molecular weight of this polymer obtained by the measurement by a gel permeation chromatography method was 76,000 in terms of polystyrene.

Further, identification of the obtained resin dispersant was performed by use of NMR and IR spectra.

Resin dispersants (P-9) to (P-14) were each synthesized in a manner substantially similar to that in the synthesis of resin dispersant (P-8) described above, except that the composition of monomer used in the synthesis of resin dispersant (P-8) was properly changed. In this process, the molecular weight was adjusted by adjusting the addition amount of 2,2'-azobis (2-methylbutyronitrile), which is the polymerization initiator.

Synthesis Example 3

—Synthesis of Resin Dispersant (A-1)—

Resin dispersant (A-1) was synthesized in a manner substantially similar to that in the synthesis of resin dispersant (P-8) described above, except that the type and usage amount of monomers were properly changed so that a composition of polymer represented by the following chemical formula was obtained. The weight average molecular weight of this polymer was 36,000 in terms of polystyrene.

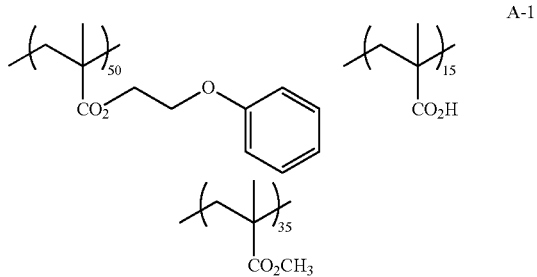

A-1

Synthesis Example 4

—Synthesis of Resin Dispersants (A-2) and (A-3)—

Resin dispersants (A-2) and (A-3) were each synthesized according to the method described in paragraphs [0050] to [0053] of JP-A No. 2004-97955.

It should be noted that resin dispersant (A-2) is a compound having a polymerizable group, and represented by formula: $[X-A^1-Y-A^1-X]$. Herein, $A^1$ represents a constituent unit which is derived from a trimer of tolylene diisocyanate and is an adduct formed with aminopropylimidazole; X represents a constituent unit derived from polyethylene glycol having an acrylate group at one end; and Y represents a constituent unit derived from polypropylene glycol. The constituent ratio thereof is $A^1:X:Y=2:2:1$.

Further, resin dispersant (A-3) is a compound having a polymerizable group, and represented by formula: $[X-A^3-X]$. Herein, $A^3$ represents a constituent unit which is derived from a trimer of tolylene diisocyanate and is an adduct formed with aminopropylimidazole; and X represents a constituent unit derived from polyethylene glycol having an acrylate group at one end. The constituent ratio thereof is $A^3:X=1:2$.

Example 1

(Preparation of Colorant Particle Dispersion (Pigment Dispersion (D-1))

10 parts of Pigment Blue 15:3 (PB 15:3; trade name: PHTHALOCYANINE BLUE A220, manufactured by Dainichiseika Color & Chemicals Mfg. Co., Ltd.), 5 parts of resin dispersant (P-1) obtained as described above, 42 parts of methyl ethyl ketone, 5.5 parts of a 1 mol/L aqueous solution of sodium hydroxide, and 87.2 parts of ion exchanged water were mixed, and dispersed for a period of from 2 hours to 6 hours using a bead mill with zirconia beads having a diameter of 0.1 mm.

From the resulting dispersion, methyl ethyl ketone was removed at 55° C. under a reduced pressure, and further a part of water was removed, to obtain a colorant particle dispersion having a pigment concentration of 10.2%. The dispersion was further subjected to centrifugal separation using a centrifugal machine (trade name: 05P-21, manufactured by Hitachi, Ltd.) at 5,000 rpm for 30 minutes. Then, ion exchanged water was added thereto so that the pigment concentration became 6%, and then the resulting dispersion was subjected to pressure filtration using a membrane filter having a pore size of 2.5 µm (manufactured by Advantec Toyo Kaisha, Ltd.). Thereafter, ion exchanged water was added thereto so that the pigment concentration became 4%. In this way, colored particle dispersion (D-1) was obtained.

(Preparation of Ink Composition (J-1))

Ink composition (J-1) was prepared using colored particle dispersion (D-1) obtained as described above. The respective components were mixed to obtain the following ink composition and then, the mixture was subjected to centrifugal separation (at 10,000 rpm to 20,000 rpm, for a period of from 30 minutes to 2 hours), to obtain ink composition (J-1).

The pH of the ink composition measured using a pH meter WM-50EG (trade name, manufactured by DKK-TOA Corporation) was 8.6.

| Ink Composition | |
|---|---|
| Colored particle dispersion (D-1) | 40 parts |
| Exemplary compound 1-1 (polymerization initiator) | 3 parts |
| Exemplary compound 2-1 (polymerizable compound) | 20 parts |
| Glycerin | 7 parts |
| Diethylene glycol | 9 parts |
| Triethanolamine | 1 part |
| OLFINE E1010 (trade name, manufactured by Nissin Chemical Industry Co., Ltd.) | 1 part |
| Triethylene glycol monobutyl ether | 9 parts |
| Ion exchanged water | 10 parts |

(Preparation of Treatment Liquid)

A treatment liquid was prepared by mixing the respective components to give the following composition. Concerning the physical property values of the treatment liquid, the treatment liquid had viscosity of 2.6 mPa·s, a surface tension of 37.3 mN/m, and pH of 1.6 (at 25° C.).

| Composition of Treatment Liquid | |
| --- | --- |
| Malonic acid (a divalent carboxylic acid; manufactured by Wako Pure Chemical Industries, Ltd.) | 15.0% |
| Diethylene glycol monomethyl ether (manufactured by Wako Pure Chemical Industries, Ltd.) | 20.0% |
| N-Oleoyl-N-methyltaurine sodium salt (surfactant) | 1.0% |
| Ion exchanged water | 64.0% |

Example 2

Colored particle dispersions (D-2) to (D-41) were each prepared in a manner substantially similar to that in the preparation of colored particle dispersion (D-1) in Example 1, except that the resin dispersant and pigment shown in Table 2 below were used instead of using resin dispersant (P-1) and the pigment (PB 15:3) in Example 1.

Details concerning the pigments described in Table 2 are as follows.
- C.I. Pigment Red 122 (PR 122; trade name: CROMOPHTAL JET MAGENTA DMQ, manufactured by Ciba)
- C.I. Pigment Yellow 74 (PY 74; trade name: IRGALITE YELLOW GS, manufactured by Ciba)
- Carbon black (CB; trade name: NIPEX 180-IQ, manufactured by Degussa)

(Preparation of Ink Composition)

Ink compositions (J-2) to (J-41) were each prepared in a manner substantially similar to that in the preparation of ink composition (J-1) in Example 1, except that colored particle dispersion (D-2) to (D-41) prepared as described above were used, respectively, instead of using colored particle dispersion (D-1) in Example 1.

Comparative Example 1

Colored particle dispersions (D-42) to (D-53) were each prepared in a manner substantially similar to that in the preparation of colored particle dispersion (D-1) in Example 1, except that the resin dispersant and pigment shown in Table 2 below were used instead of using resin dispersant (P-1) and the pigment (PB 15:3) in Example 1.

Further, ink compositions (J-42) to (J-53) were each prepared in a manner substantially similar to that in the preparation of ink composition (J-1) in Example 1, except that colored particle dispersion (D-42) to (D-53) prepared as described above were used, respectively, instead of using colored particle dispersion (D-1) in Example 1.

<Evaluation>

[Evaluation of Colorant Particle Dispersion]

(1) Volume Average Particle Diameter

The volume average particle diameter of each of the colored particle dispersions obtained as described above was measured using a NANOTRAC particle size distribution analyzer UPA-EX150 (trade name, manufactured by Nikkiso Co., Ltd.) in accordance with a dynamic light scattering method, and was evaluated according to the following criteria. Evaluation results are shown in Table 2. Note that, "C" in the evaluation criteria is a practically acceptable level.

Measurement conditions: 10 mL of ion exchanged water was added to 10 μL of a dispersion to prepare a dispersion liquid for measurement. The measurement was performed at 25° C.

~Evaluation Criteria~

A: The volume average particle diameter is 70 nm or more but less than 100 nm.

B: The volume average particle diameter is 100 nm or more but less than 130 nm.

C: The volume average particle diameter is 130 nm or more but less than 200 nm.

D: The volume average particle diameter is 200 nm or more.

[Evaluation of Ink Composition]

Evaluation of the ink composition was performed using a prototype print head with 600 dpi and 256 nozzles as an ink-jet recording device and using each of the aqueous inks (J-1) to (J-53) as an aqueous ink composition for ink-jet recording.

(1) Ejection Stability

Upon printing using the above ink-jet recording device, the printed matter was observed to determine the frequency of occurrence of flight deviation of ink (phenomenon in which the ejected ink droplet reaches a deviated position of the receiving material) and mist, during the period from the initiation of the printing to the completion of the printing. Evaluation was made according to the following criteria.

—Evaluation Criteria—

A: Flight deviation of ink and mist hardly occur.

B: Flight deviation of ink and mist occur, but the frequency is low to the extent not being practically problematic.

C: Flight deviation of ink and mist occur, but the frequency of the occurrence is rather high, although is not at a level of frequent occurrence, and there is a possibility to be practically problematic when a high image quality is required.

D: Flight deviation of ink and mist frequently occur, that is practically problematic.

(2) Ejection Recoverability

After printing using the ink-jet recording device substantially the same to the above, the ink-jet recording device was left for one day under an environment of 25° C. and 65% RH with the head portion uncovered and being in a state of being exposed in the air. Thereafter, ejection was carried out again, and during the re-ejection, the ejection state was observed. Evaluation was made according to the following criteria. Note that, the predetermined maintenance described below refers to an operation of removing the clogging of a head by ejecting an ink while applying a pressure of 15 Pa.

—Evaluation Criteria—

A: It is possible to eject the ink without performing the predetermined maintenance.

B: It is possible to eject the ink again by performing the predetermined maintenance.

C: It is possible to eject the ink again by performing the predetermined maintenance twice.

D: It is not possible to eject the ink even though the predetermined maintenance is performed for three times.

(3) Image Quality

A sheet of "OK TOPCOAT+" (trade name, manufactured by Oji Paper Co., LTD.) (which served as a recording medium) was fixed on a stage that was movable at a velocity of 500 mm/sec. The treatment liquid obtained as described above was coated thereon using a wire bar coater to give a thickness of about 1.2 μm, and dried at 50° C. for 2 seconds immediately after the coating.

After that, a solid image was printed as follows: a printer head GELJET GX5000 (trade name, manufactured by Ricoh Co., Ltd.) which was arranged and fixed such that the direction of the printer head was inclined (at an angle of 75.5 degree) with respect to the scanning direction was used; and the ink composition obtained as described above was ejected by a line system under the ejection conditions of a definition of 1200 dpi×1200 dpi and an ink droplet amount of 2.4 pL, whereby a solid image was printed. Immediately after the printing, the printed recording medium was dried at 60° C. for 3 seconds, and further exposed to light using a UV lamp at an exposure amount of 2.5 J/cm$^2$ so that fixing processing was carried out. In this way, a printed sample was obtained. With regard to the obtained printed sample, the printed state was observed visually or using a magnifying glass. Evaluation was made according to the following evaluation criteria.

—Evaluation Criteria—

A: It is hard to find a white spot portion even when the printed sample is observed using a magnifying glass.

B: It is hard to find a white spot portion when the printed sample is visually observed, but it is possible to find white spot portions by using a magnifying glass.

C: It is possible to find white spot portions when the printed sample is visually observed (without using a magnifying glass).

D: It is easy to perceive white spot portions when the printed sample is visually observed (without using a magnifying glass).

(4) Glossiness

With respect to the printed sample obtained in the substantially same manner as that in the evaluation of image quality, the 60° gloss was measured using a digital variable glossimeter (manufactured by Suga Test Instruments Co., Ltd.). Evaluation was made according to the following evaluation criteria.

—Evaluation Criteria—

A: 70 or more

B: 55 or more but less than 70

C: 40 or more but less than 55

D: less than 40

TABLE 2

| Ink Composition | Colorant Particle Dispersion | Resin Dispersant | Pigment | Volume Average Particle Diameter | Ejection Stability | Ejection Recoverability | Image Quality | Glossiness | Note |
|---|---|---|---|---|---|---|---|---|---|
| J-1 | D-1 | P-1 | PB 15:3 | C | A | A | A | B | Invention |
| J-2 | D-2 | P-2 | PB 15:3 | B | A | A | A | B | Invention |
| J-3 | D-3 | P-3 | PB 15:3 | B | A | A | A | B | Invention |
| J-4 | D-4 | P-4 | PB 15:3 | A | A | A | A | B | Invention |
| J-5 | D-5 | P-5 | PB 15:3 | A | A | A | A | B | Invention |
| J-6 | D-6 | P-6 | PB 15:3 | A | A | A | A | B | Invention |
| J-7 | D-7 | P-7 | PB 15:3 | A | A | A | A | B | Invention |
| J-8 | D-8 | P-8 | PB 15:3 | B | A | A | A | B | Invention |
| J-9 | D-9 | P-9 | PB 15:3 | B | A | A | A | B | Invention |
| J-10 | D-10 | P-10 | PB 15:3 | B | A | A | A | B | Invention |
| J-11 | D-11 | P-11 | PB 15:3 | B | A | A | A | B | Invention |
| J-12 | D-12 | P-12 | PB 15:3 | A | A | A | A | B | Invention |
| J-13 | D-13 | P-13 | PB 15:3 | A | A | A | A | B | Invention |
| J-14 | D-14 | P-14 | PB 15:3 | A | A | A | A | B | Invention |
| J-15 | D-15 | P-15 | PB 15:3 | B | A | A | A | B | Invention |
| J-16 | D-16 | P-16 | PB 15:3 | B | A | A | A | B | Invention |
| J-17 | D-17 | P-17 | PB 15:3 | B | A | A | A | B | Invention |
| J-18 | D-18 | P-1 | PR 122 | C | A | A | A | B | Invention |
| J-19 | D-19 | P-2 | PR 122 | B | A | A | A | B | Invention |
| J-20 | D-20 | P-3 | PR 122 | B | A | A | A | B | Invention |
| J-21 | D-21 | P-4 | PR 122 | A | A | A | A | B | Invention |
| J-22 | D-22 | P-5 | PR 122 | A | A | A | A | B | Invention |
| J-23 | D-23 | P-6 | PR 122 | A | A | A | A | B | Invention |
| J-24 | D-24 | P-11 | PR 122 | B | A | A | A | B | Invention |
| J-25 | D-25 | P-14 | PR 122 | A | A | A | A | B | Invention |
| J-26 | D-26 | P-1 | PY 74 | C | A | A | A | B | Invention |
| J-27 | D-27 | P-2 | PY 74 | B | A | A | A | B | Invention |
| J-28 | D-28 | P-3 | PY 74 | B | A | A | A | B | Invention |
| J-29 | D-29 | P-4 | PY 74 | A | A | A | A | B | Invention |
| J-30 | D-30 | P-5 | PY 74 | A | A | A | A | B | Invention |
| J-31 | D-31 | P-6 | PY 74 | A | A | A | A | B | Invention |
| J-32 | D-32 | P-11 | PY 74 | B | A | A | A | B | Invention |
| J-33 | D-33 | P-14 | PY 74 | A | A | A | A | B | Invention |
| J-34 | D-34 | P-1 | CB | C | A | A | A | B | Invention |
| J-35 | D-35 | P-2 | CB | B | A | A | A | B | Invention |
| J-36 | D-36 | P-3 | CB | B | A | A | A | B | Invention |
| J-37 | D-37 | P-4 | CB | A | A | A | A | B | Invention |
| J-38 | D-38 | P-5 | CB | A | A | A | A | B | Invention |
| J-39 | D-39 | P-6 | CB | A | A | A | A | B | Invention |
| J-40 | D-40 | P-11 | CB | B | A | A | A | B | Invention |
| J-41 | D-41 | P-14 | CB | A | A | A | A | B | Invention |
| J-42 | D-42 | A-1 | PB 15:3 | B | B | C | C | C | Comparative |
| J-43 | D-43 | A-2 | PB 15:3 | C | C | D | C | D | Comparative |
| J-44 | D-44 | A-3 | PB 15:3 | C | C | D | C | D | Comparative |
| J-45 | D-45 | A-1 | PR 122 | B | B | C | C | C | Comparative |
| J-46 | D-46 | A-2 | PR 122 | C | C | D | C | D | Comparative |
| J-47 | D-47 | A-3 | PR 122 | C | C | D | C | D | Comparative |
| J-48 | D-48 | A-1 | PY 74 | B | B | C | C | C | Comparative |
| J-49 | D-49 | A-2 | PY 74 | C | C | D | C | D | Comparative |
| J-50 | D-50 | A-3 | PY 74 | C | C | D | C | D | Comparative |

TABLE 2-continued

| Ink Composition | Colorant Particle Dispersion | Resin Dispersant | Pigment | Volume Average Particle Diameter | Ejection Stability | Ejection Recoverability | Image Quality | Glossiness | Note |
|---|---|---|---|---|---|---|---|---|---|
| J-51 | D-51 | A-1 | CB | B | B | C | C | C | Comparative |
| J-52 | D-52 | A-2 | CB | C | C | D | C | D | Comparative |
| J-53 | D-53 | A-3 | CB | C | C | D | C | D | Comparative |

As is evident from Table 2, the ink composition of the present invention exhibited excellent ejection stability and excellent ejection recoverability. Further, it is understood that the ink composition of the present invention can form an image having excellent image quality and excellent glossiness.

According to the present invention, it is possible to provide an ink composition that can form an image having high glossiness, and can exhibit excellent ejection stability and excellent ejection recoverability when applied to an ink-jet method.

Exemplary embodiments of the present invention include the followings. However, the invention is not limited to the following exemplary embodiments.

<1> An ink composition comprising colored particles, the colored particles comprising:
a resin dispersant including at least one radically polymerizable group and at least one aromatic partial structure derived from a compound selected from the group consisting of an aromatic hydrocarbon compound, a condensed ring aromatic hydrocarbon compound, an aromatic heterocyclic compound, a condensed ring aromatic heterocyclic compound and a compound having two or more aromatic hydrocarbon compounds linked to each other; and a colorant.

<2> The ink composition of <1>, further comprising an aqueous medium.

<3> The ink composition of <1> or <2>, further comprising a polymerizable compound including an ethylenically unsaturated bond.

<4> The ink composition of any one of <1> to <3>, wherein the colorant included in the colored particles is a pigment and the pigment is coated with the resin dispersant.

<5> The ink composition of any one of <1> to <4>, wherein the resin dispersant further includes a hydrophilic structural unit.

<6> The ink composition of any one of <1> to <5>, wherein the resin dispersant includes a hydrophobic structural unit that includes the aromatic partial structure, a main chain of the resin dispersant, and a divalent linking group that links the aromatic partial structure and the main chain.

<7> The ink composition of <6>, wherein the hydrophobic structural unit includes a structural unit represented by the following formula (1):

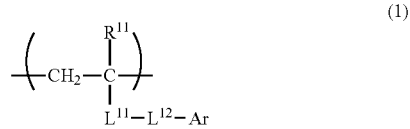

(1)

wherein in formula (1), $R^{11}$ represents a hydrogen atom or a methyl group; $L^{11}$ represents —COO—, OCO—, —CONR$^{13}$—, —O— or a substituted or unsubstituted phenylene group, wherein $R^{13}$ represents a hydrogen atom or an alkyl group having from 1 to 6 carbon atoms; $L^{12}$ represents a single bond, a divalent linking group selected from the group consisting of alkylene groups having from 1 to 12 carbon atoms, alkenylene groups having from 2 to 12 carbon atoms, —CO—, —O—, —S—, —SO—, —SO$_2$— and —NR$^{14}$—, or a divalent linking group obtained by combining two or more linking groups selected from the group consisting of alkylene groups having from 1 to 12 carbon atoms, alkenylene groups having from 2 to 12 carbon atoms, —CO—, —O—, —S—, —SO—, —SO$_2$— and —NR$^{14}$—, wherein $R^{14}$ represents a hydrogen atom or an alkyl group having from 1 to 6 carbon atoms; and Ar represents a monovalent group derived from benzene, a condensed ring aromatic compound having 8 or more carbon atoms, a heterocyclic compound condensed with at least one aromatic ring, or a compound containing two or more benzene rings linked to each other.

<8> The ink composition of <7>, wherein in formula (1), $L^{11}$ represents —COO— or —CONR$^{13}$—; and $R^{13}$ represents a hydrogen atom or an alkyl group having from 1 to 6 carbon atoms.

<9> The ink composition of <7> or <8>, wherein in formula (1), Ar is a phenyl group.

<10> The ink composition of any one of <1> to <9>, which is an ink composition for ink-jet recording.

<11> An ink set comprising:
the ink composition of any one of <1> to <10>, and a treatment liquid including an aggregating agent that forms an aggregate when the treatment liquid is in contact with the ink composition.

<12> An image forming method comprising forming an image by supplying the ink composition of any one of <1> to <10> onto a recording medium.

<13> The image forming method of <12>, further comprising supplying, onto a recording medium, a treatment liquid that forms an aggregate when the treatment liquid is in contact with the ink composition.

<14> The image forming method of <12> or <13>, further comprising irradiating the ink composition supplied onto the recording medium with actinic radiation.

What is claimed is:
1. An ink composition comprising colored particles, the colored particles comprising:
a resin dispersant including at least one radically polymerizable group represented by the following Formula (A), (B), or (C), and including at least one aromatic partial structure derived from a compound selected from the group consisting of an aromatic hydrocarbon compound, a condensed ring aromatic hydrocarbon compound, an aromatic heterocyclic compound, a condensed ring aromatic heterocyclic compound and a compound having two or more aromatic hydrocarbon compounds linked to each other; and
a colorant;

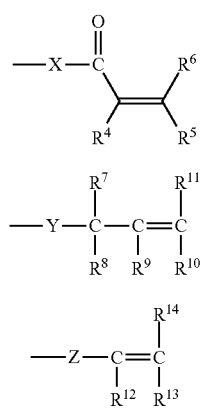

wherein, in Formulae (A) to (C), $R^4$ to $R^{14}$ each independently represent a hydrogen atom or a monovalent substituent; X and Y each independently represent an oxygen atom, a sulfur atom, or —$NR^{15}$—; Z represents an oxygen atom, a sulfur atom, —$NR^{15}$—, or a phenylene group; and $R^{15}$ represents a hydrogen atom or a monovalent organic group.

2. The ink composition of claim 1, further comprising an aqueous medium.

3. The ink composition of claim 1, further comprising a polymerizable compound including an ethylenically unsaturated bond.

4. The ink composition of claim 1, wherein the colorant included in the colored particles is a pigment and the pigment is coated with the resin dispersant.

5. The ink composition of claim 1, wherein the resin dispersant further includes a hydrophilic structural unit.

6. The ink composition of claim 1, wherein the resin dispersant includes a hydrophobic structural unit that includes the aromatic partial structure, a main chain of the resin dispersant, and a divalent linking group that links the aromatic partial structure and the main chain.

7. The ink composition of claim 6, wherein the hydrophobic structural unit includes a structural unit represented by the following formula (I):

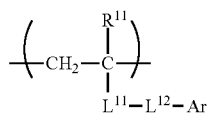

wherein, in formula (I), $R^{11}$ represents a hydrogen atom or a methyl group; $L^{11}$ represents —COO—, OCO—, —$CONR^{13}$—, —O— or a substituted or unsubstituted phenylene group, wherein $R^{13}$ represents a hydrogen atom or an alkyl group having from 1 to 6 carbon atoms; $L^{12}$ represents a single bond, a divalent linking group selected from the group consisting of alkylene groups having from 1 to 12 carbon atoms, alkenylene groups having from 2 to 12 carbon atoms, —CO—, —O—, —S—, —SO—, —$SO_2$— and —$NR^{14}$—, or a divalent linking group obtained by combining two or more linking groups selected from the group consisting of alkylene groups having from 1 to 12 carbon atoms, alkenylene groups having from 2 to 12 carbon atoms, —CO—, —O—, —S—, —SO—, —$SO_2$— and —$NR^{14}$—, wherein $R^{14}$ represents a hydrogen atom or an alkyl group having from 1 to 6 carbon atoms; and Ar represents a monovalent group derived from benzene, a condensed ring aromatic compound having 8 or more carbon atoms, a heterocyclic compound condensed with at least one aromatic ring, or a compound containing two or more benzene rings linked to each other.

8. The ink composition of claim 7, wherein, in formula (I), $L^{11}$ represents —COO— or —$CONR^{13}$—; and $R^{13}$ represents a hydrogen atom or an alkyl group having from 1 to 6 carbon atoms.

9. The ink composition of claim 7, wherein, in formula (I), Ar is a phenyl group.

10. The ink composition of claim 1, which is an ink composition for ink jet recording.

11. An ink set comprising:
the ink composition of claim 1; and
a treatment liquid including an aggregating agent that forms an aggregate when the treatment liquid is in contact with the ink composition.

12. An image forming method comprising forming an image by supplying the ink composition of claim 1 onto a recording medium.

13. The image forming method of claim 12, further comprising supplying, onto a recording medium, a treatment liquid that forms an aggregate when the treatment liquid is in contact with the ink composition.

14. The image forming method of claim 12, further comprising irradiating the ink composition supplied to the recording medium with actinic radiation.

15. The ink composition of claim 2, wherein the aqueous medium includes water.

16. The ink composition of claim 1, wherein the content of a structural unit having the at least one radically polymerizable group in the resin dispersant is from 1% by mass to 90% by mass.

17. The ink composition of claim 1, wherein the content of a structural unit having the at least one radically polymerizable group in the resin dispersant is from 10% by mass to 60% by mass.

* * * * *